United States Patent [19]

Moshier

[11] Patent Number: 4,489,434
[45] Date of Patent: Dec. 18, 1984

[54] SPEECH RECOGNITION METHOD AND APPARATUS

[75] Inventor: Stephen L. Moshier, Cambridge, Mass.

[73] Assignee: Exxon Corporation, New York, N.Y.

[21] Appl. No.: 308,891

[22] Filed: Oct. 5, 1981

[51] Int. Cl.$^3$ .................................................. G10L 1/00
[52] U.S. Cl. .......................................................... 381/43
[58] Field of Search ............. 179/1.5 D, 1.5 B, 1.5 C; 340/146.3 R, 146.3 AQ, 146.3 WD; 364/513

[56] References Cited

U.S. PATENT DOCUMENTS

| | | | |
|---|---|---|---|
| 3,816,722 | 6/1974 | Sakoe et al. | 232/152 |
| 4,038,503 | 7/1977 | Moshier | 179/1 |
| 4,049,913 | 9/1977 | Sakoe | 179/1 |
| 4,059,725 | 11/1977 | Sakoe | 179/1.5 |
| 4,107,460 | 8/1978 | Grunza | 179/1.5 D |
| 4,156,868 | 5/1979 | Levinson | 179/1.5 D |
| 4,227,176 | 10/1980 | Moshier | 340/146.3 |
| 4,227,177 | 10/1980 | Moshier | 340/146.3 |
| 4,241,329 | 12/1980 | Bahler et al. | 340/146.3 |
| 4,282,403 | 8/1981 | Sakoe | 179/1 |
| 4,282,405 | 8/1981 | Taguchi | 179/1 |
| 4,301,329 | 11/1981 | Taguchi | 179/1 |

Primary Examiner—E. S. Matt Kemeny
Attorney, Agent, or Firm—Lahive & Cockfield

[57] ABSTRACT

A speech recognition method and apparatus for detecting and recognizing one or more keywords in a continuous audio signal are disclosed. Each keyword is represented by a keyword template which corresponds to a sequence of plural target patterns, and each target pattern comprises statistics representing each of a plurality of spectra selected from plural short-term spectra generated according to a predetermined system for processing the incoming audio. The target patterns also have associated therewith minimum and maximum dwell times. The dwell time is the time interval during which a given target pattern can be said to match incoming frame patterns. The spectra are processed to enhance the separation between the spectral pattern classes during later analysis. The processed audio spectra are grouped into multi-frame spectral patterns and each multi-frame spectral pattern is compared by means of likelihood statistics with the target patterns of keyword templates. Each formed multi-frame pattern is then forced to contribute to the total word score for each keyword as represented by the keyword template. Thus the keyword recognition method requires all input patterns to contribute to the word score of a keyword candidate, using the minimum and maximum dwell times for testing whether a target pattern can still match an input pattern, and wherein the frame rate of the audio spectra must be less than one-half the minimum dwell time of a target pattern. A concatenation technique employing a loosely set detection threshold makes it very unlikely that a correct pattern will be rejected. A method for forming the target patterns is also described.

16 Claims, 13 Drawing Figures

Microfiche Appendix Included
(16 Microfiche, 742 Pages)

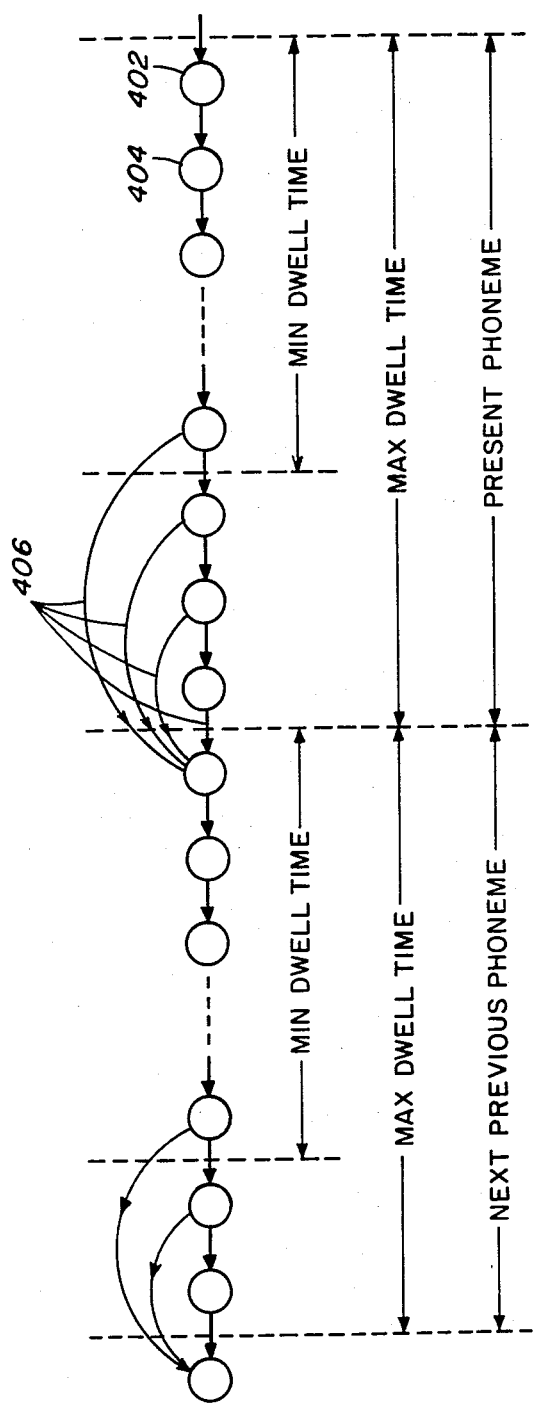
FIG. 4
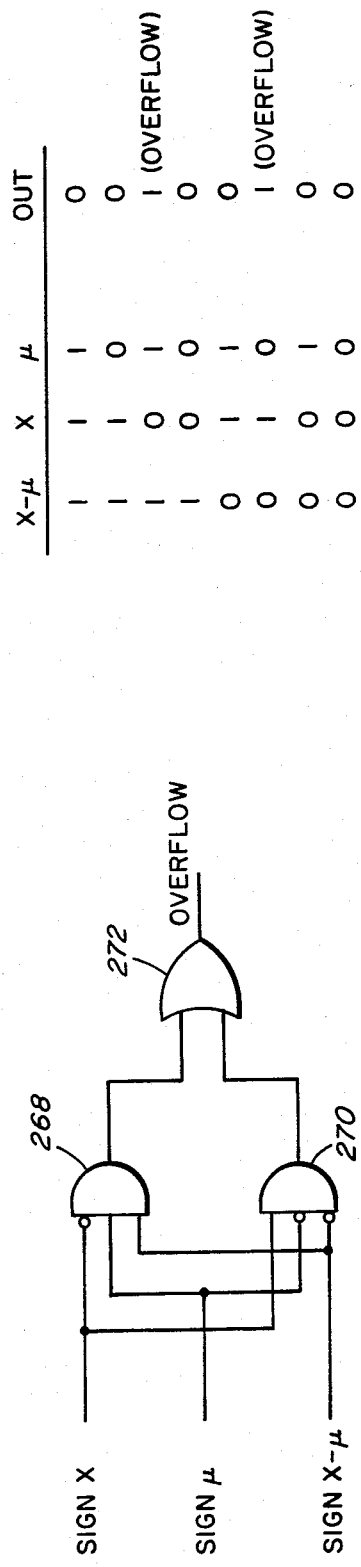
FIG. 8
FIG. 7

SPEECH RECOGNITION METHOD AND APPARATUS

Appendices 1, 2, and 3 have been submitted with the application for entry and availability in the application file, but for convenience, have not been submitted for publication. The appendices are available on microfiche. There are 16 microfiche and a total of 742 frames.

BACKGROUND

The invention herein described was made in the course of or under a contract with the Department of the Air Force.

The present invention relates to a speech recognition method and apparatus and more particularly to a method of and apparatus for recognizing in real time, one or more keywords in a continuous audio signal.

Various speech recognition systems have been proposed heretofore to recognize isolated utterances by comparing an unknown isolated audio signal, suitably processed, with one or more previously prepared representations of known keywords. In this context, "keywords" is used to mean a connected group of phonemes and sounds and may be, for example, a portion of a syllable, a word, a phrase, etc. While many systems have met with limited success, one system, in particular, has been employed successfully, in commercial applications, to recognize isolated keywords. This system operates substantially in accordance with the method described in U.S. Pat. No. 4,038,503, granted July 26, 1977, assigned to the assignee of this application, and provides a successful method for recognizing one of a restricted vocabulary of keywords provided that the boundaries of the unknown audio signal data are either silence or background noise as measured by the recognition system. That system relies upon the presumption that the interval, during which the unknown audio signal occurs, is well defined and contains a single keyword utterance.

In a continuous audio signal, such as continuous conversational speech, wherein the keyword boundaries are not a priori known or marked, several methods have been devised to segment the incoming audio data, that is, to determine the boundaries of linguistic units, such as phonemes, syllables, words, sentences, etc., prior to initiation of a keyword recognition process. These prior continuous speech systems, however, have achieved only a limited success in part because a satisfactory segmenting process has not been found. Other substantial problems still exist: for example, only limited vocabularies can be consistently recognized with a low false alarm rate; the recognition accuracy is highly sensitive to the differences between voice characteristics of different talkers; and the systems are highly sensitive to distortion in the audio signals being analyzed, such as typically occurs, for example, in audio signals transmitted over ordinary telephone communications apparatus.

The continuous speech recognition methods described in U.S. applications Ser. Nos. 901,001; 901,005; and 901,006, all filed April 27, 1978, and now U.S. Pat. Nos. 4,227,176; 4,241,329; and 4,227,177, respectively, describe commercially acceptable and effective procedures for successfully recognizing, in real time, keywords in continuous speech systems. The general methods described in these patents are presently in commercial use and have been proved both experimentally and in practical field testing to effectively provide a high reliability and low error rate, in a speaker-independent environment. Nevertheless, even these systems, while at the forefront of present day technology, and the concept upon which they were developed, have shortcomings in both the false-alarm rate and speaker-independent performance.

Therefore, a principal object of the present invention is a speech recognition method and apparatus having improved effectiveness in recognizing keywords in a continuous, unmarked audio signal. Other objects of the invention are a method and apparatus which are relatively insensitive to phase and amplitude distortion of the unknown audio input signal data, which are relatively insensitive to variations in the articulation rate of the unknown audio input signals, which will respond equally well to different speakers and hence different voice characteristics, which are reliable and have an improved lower false-alarm rate, and which operate in real time.

SUMMARY OF THE INVENTION

The invention relates to a speech analysis system for recognizing at least one predetermined keyword in an audio signal. Each keyword is characterized by a pattern template having at least one target pattern and each target pattern represents at least one short-term power spectrum. Each target pattern has associated therewith a maximum dwell time duration and a minimum dwell time duration that is, a time interval during which a given target pattern can be said to match an incoming frame pattern.

The method of the invention features forcing each analysis frame pattern, formed to represent the audio input signal, to contribute to the total numerical word score by which recognition decisions are made.

The method features the steps of forming, at a repetitive frame rate, a sequence of frame patterns from and representing the audio input signal. The frame rate must be less than one-half of the minimum dwell time of a target pattern. Each frame pattern is associated with a frame time. There is then generated, for each frame pattern, a numerical measure of the similarity of the frame pattern with selected ones of the target patterns. A target pattern can be said to match an incoming frame pattern only when the conditions imposed by the minimum and maximum dwell times are met. Preferably, numerical measures are generated representing the similarity of each frame pattern with each target pattern. At each frame time, and for each keyword, a numerical word score representing the likelihood that a keyword has ended at the then present frame time is accumulated, making use of the numerical measures. The accumulation step includes accumulating numerical measures for each of a continuous sequence of the repetitively formed frame patterns, starting with the numerical measure of the similarity of the present frame pattern and the target pattern which occurs last in the keyword. Thereafter, at least a preliminary keyword recognition decision is generated whenever a thus determined numerical value for a keyword exceeds a predetermined recognition level.

In another aspect, the invention relates to a speech recognition apparatus having means for forming, at a first repetitive frame rate, a sequence of frame patterns from and representing the audio signal, each frame pattern being associated with a frame time. There are further provided means for generating, for each frame pattern, a numerical measure of the similarity of each of the frame patterns with selected ones of the target patterns. Preferably, as with the method above, the numerical measures are generated for each frame pattern relative to each target pattern.

An accumulating element totals, for each frame time and each keyword, a numerical word score representing the likelihood that a keyword has ended at the then present frame time. The totals are determined for each frame time and for each keyword. The accumulating element includes apparatus for accumulating, for each keyword, the numerical measures for each of a contiguous sequence of the repetitively formed frame patterns, starting with the numerical measure of the similarity of a present frame pattern and a last target pattern of the keyword. The apparatus further features means for generating at least a preliminary keyword recognition signal whenever the numerical value accumulated for a keyword exceeds a predetermined criteria.

BRIEF DESCRIPTION OF THE DRAWINGS

Other objects, features, and advantages of the invention will appear from the following description of a preferred embodiment taken together with the drawings in which:

FIG. 4 is a graphical representation of the alignment process according to the preferred embodiment of the invention;

FIG. 7 is an electrical circuit diagram of an overflow detection logic circuit according to a preferred embodiment of the invention;

FIG. 8 is a truth table for the circuit diagram of FIG. 7;

Corresponding reference characters indicate corresponding elements throughout the several views of the drawings.

DESCRIPTION OF A PREFERRED EMBODIMENT

In one of the particular preferred embodiments which is described herein, speech recognition is performed by an overall apparatus which involves both a specially constructed electronic system for effecting certain analog and digital processing of incoming audio data signals, generally speech, and a general purpose digital computer which is programmed in accordance with the present invention to effect certain other data reduction steps and numerical evaluations. The division of tasks between the hardware portion and the software portion of this system has been made so as to obtain an overall system which can accomplish speech recognition in real time at moderate cost. However, it should be understood that some of the tasks being performed in hardware in this particular system could well be performed in software and that some of the tasks being performed by software programming in this example might also be performed by special purpose circuitry in a different embodiment of the invention. In this later connection, where available, hardware and software implementations will be described.

Figure 1:
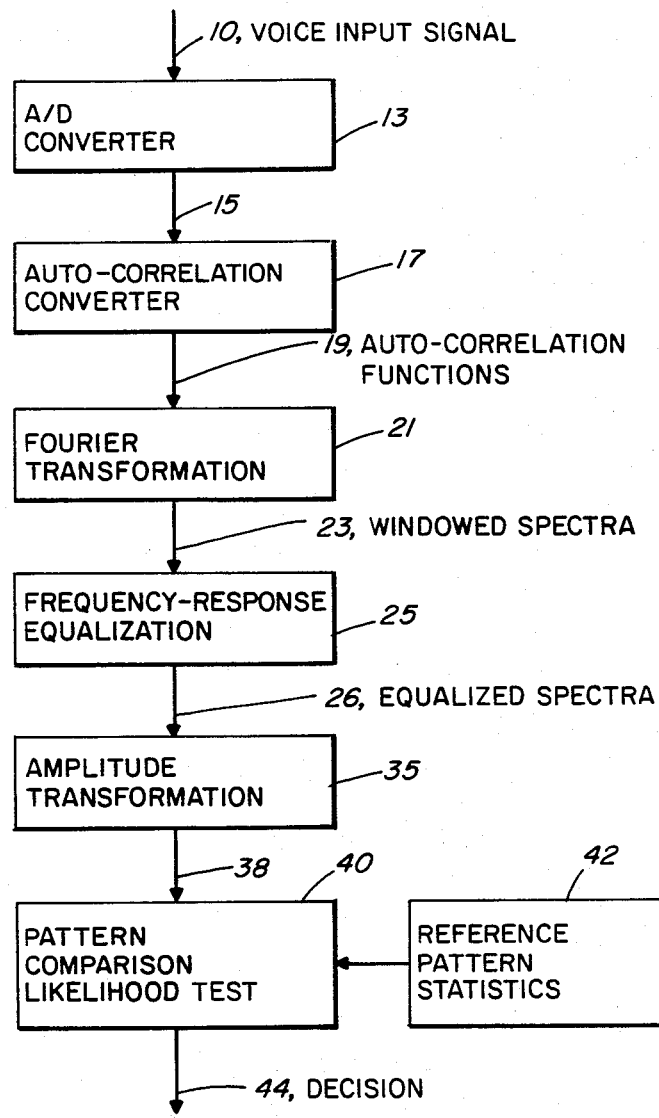
FIG. 1 is a flow chart illustrating in general terms the sequence of operations performed in accordance with the practice of the present invention.

As indicated previously, one aspect of the present invention is the provision of apparatus which will recognize keywords in continuous speech signals even though those signals are distorted, for example, by a telephone line. Thus, referring in particular to FIG. 1, the voice input signal, indicated at 10, may be considered a voice signal produced by a carbon element telephone transmitter and receiver over a telephone line encompassing any arbitrary distance or number of switching interchanges. A typical application of the invention is therefore recognizing keywords in audio data from an unknown source received over the telephone system. On the other hand, the input signal may also be any audio data signal, for example, a voice input signal, taken from a radio telecommunications link, for example, from a commercial broadcast station or from a private dedicated communications link.

As will become apparent from the description, the present method and apparatus are concerned with the recognition of speech signals containing a sequence of sounds or phonemes, or other recognizable indicia. In the description herein, and in the claims, reference is made to either "a keyword," "a sequence of target patterns," "a template pattern," or "a keyword template," the four terms being considered as generic and equivalent. This is a convenient way of expressing a recognizable sequence of audio sounds, or representations thereof, which the method and apparatus can detect. The terms should be broadly and generically construed to encompass anything from a single phomeme, syllable, or sound to a series of words (in the grammatical sense) as well as a single word.

An analog-to-digital (A/D) converter 13 receives the incoming analog audio signal data on line 10 and converts the signal amplitude of the incoming data to a digital form. The illustrated A/D converter is designed to convert the input signal data to a twelve-bit binary representation, the conversions occurring at the rate of 8,000 conversions per second. (In other embodiments, other sampling rates can be employed; for example, a 16 KHz rate can be used when a high quality signal is available.) The A/D converter 13 applies its output over lines 15 to an autocorrelator 17. The autocorrelator 17 processes the digital input signals to generate a short-term autocorrelation function one hundred times per second and applies its output, as indicated, over lines 19. Each autocorrelation function has thirty-two values or channels, each value being calculated to a 30-bit resolution. The autocorrelator is described in greater detail hereinafter with reference to FIG. 2.

The autocorrelation functions over lines 19 are Fourier transformed by Fourier transformation apparatus 21 to obtain corresponding short-term windowed power spectra over lines 23. The spectra are generated at the same repetition rate as the autocorrelation functions, that is, one hundred per second, and each short-term power spectrum has thirty-one numerical terms having a resolution of 16 bits each. As will be understood, each of the thirty-one terms in the spectrum represents the signal power within a frequency band. The Fourier transformation apparatus also preferably includes a Hamming or similar window function to reduce spurious adjacent-band responses.

Figure 3:
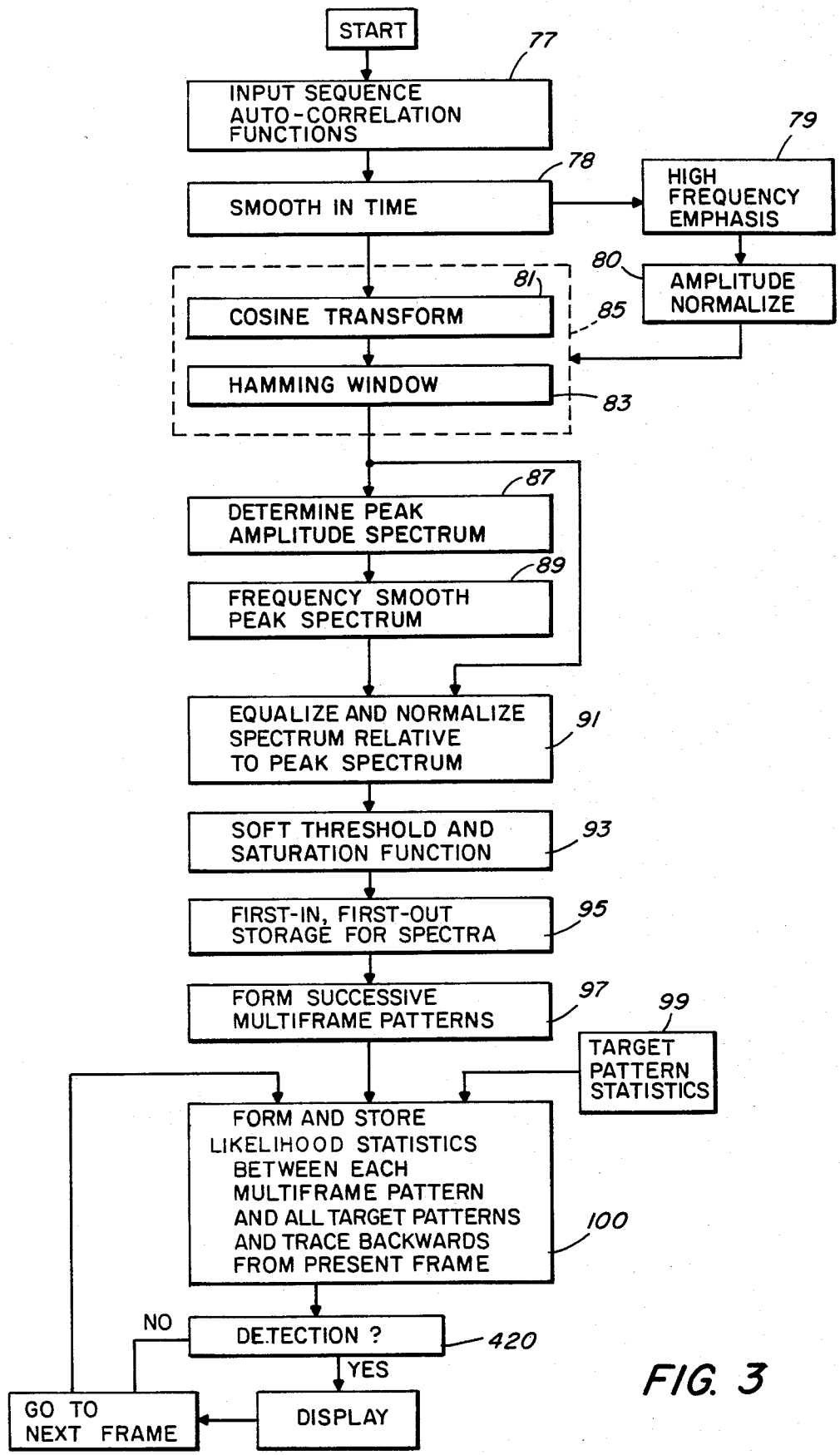
FIG. 3 is a flow diagram of a digital computer program performing certain procedures in the process of FIG. 1.

In the first illustrated embodiment, the Fourier transformation as well as subsequent processing steps are performed under the control of a general purpose digital computer, appropriately programmed, utilizing a peripheral array processor for speeding the arithmetic operations required repetitively according to the present method. The particular computer employed is a model PDP-11 manufactured by the Digital Equipment Corporation of Maynard, Mass. The particular array processor employed is described in U.S. Pat. No. 4,228,498, assigned to the assignee of this application. The programming described hereinafter with reference to FIG. 3 is substantially predicated upon the capabilities and characteristics of these available digital processing units.

The short-term windowed power spectra are frequency-response equalized, as indicated at 25, equalization being performed as a function of the peak amplitudes occurring in each frequency band or channel as described in greater detail hereinafter. The frequency-response equalized spectra, over lines 26, are generated at the rate of one hundred per second and each spectrum has thirty-one numerical terms evaluated to 16 bit accuracy. To facilitate the final evaluation of the incoming audio data, the frequency-response equalized and windowed spectra over lines 26 are subjected to an amplitude transformation, as indicated at 35, which imposes a non-linear amplitude transformation on the incoming spectra. This transformation is described in greater detail hereinafter, but it may be noted at this point that it improves the accuracy with which the unknown incoming audio signal may be matched with keywords in a reference vocabulary. In the illustrated embodiment, this transformation is performed on all of the frequency-response equalized and windowed spectra at a time prior to the comparison of the spectra with the target patterns representing the keywords in the reference vocabulary.

The amplitude transformed and equalized short-term spectra over lines 38 are then compared against the keyword target patterns at 40. The keyword target patterns, designated at 42, represent the keywords of the reference vocabulary in a statistical fashion with which the transformed and equalized spectra can be compared. Candidate words are thus selected according to the closeness of the comparison; and in the illustrated embodiment, the selection process is designed to minimize the likelihood of a missed keyword while rejecting grossly inapplicable pattern sequences. A recognition decision is provided over lines 44.

Figure 1A:
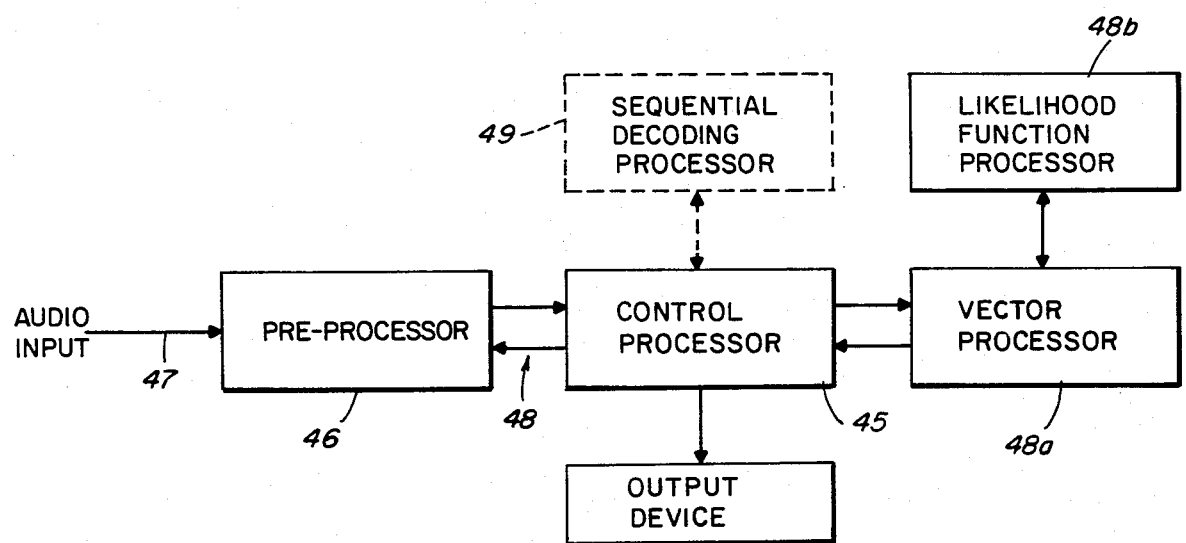
FIG. 1A is a schematic block circuit diagram of a preferred embodiment of the invention.

Referring to FIG. 1A, a speech recognition system, according to the invention, employs a controller 45 which may be for example a general purpose digital computer such as a PDP-11 or a hardware controller specifically built for the apparatus. In the illustrated embodiment, the controller 45 receives preprocessed audio data from a preprocessor 46 which is described in greater detail in connection with FIG. 2. The preprocessor 46 receives audio input analog signals over a line 47 and provides processed data over interface lines 48 to the control processor.

Generally, the operational speed of the control processor, if a general purpose element, is not fast enough to process the incoming data in real time. As a result, various special purpose hardware can be advantageously employed to effectively increase the processing speed of element 45. In particular, a vector processing element 48a such as that described in U.S. Pat. No. 4,228,498, assigned to the assignee of this invention, provides significantly increased array processing capability by using a pipeline effect. In addition, as described in more detail in connection with FIGS. 5, 6, 7 and 8, a likelihood function processor 48b can be used in connection with the Vector Processor to still further increase the operating speed of the apparatus by tenfold.

While in the preferred embodiment of the invention control processor 45 is a digital computer, in another particular embodiment, described in connection with FIGS. 9 and 10, a significant portion of the processing capability is implemented externally of the control processor in a sequential processor 49. The structure of this processor is described in greater detail in connection with FIGS. 9 and 10. Thus, the apparatus for implementing speech recognition illustrated herein has great flexibility both in its speed capabilities and in the ability to be implemented it in both hardware, software, or an advantageous combination of hardware and software elements.

Preprocessor

Figure 2:
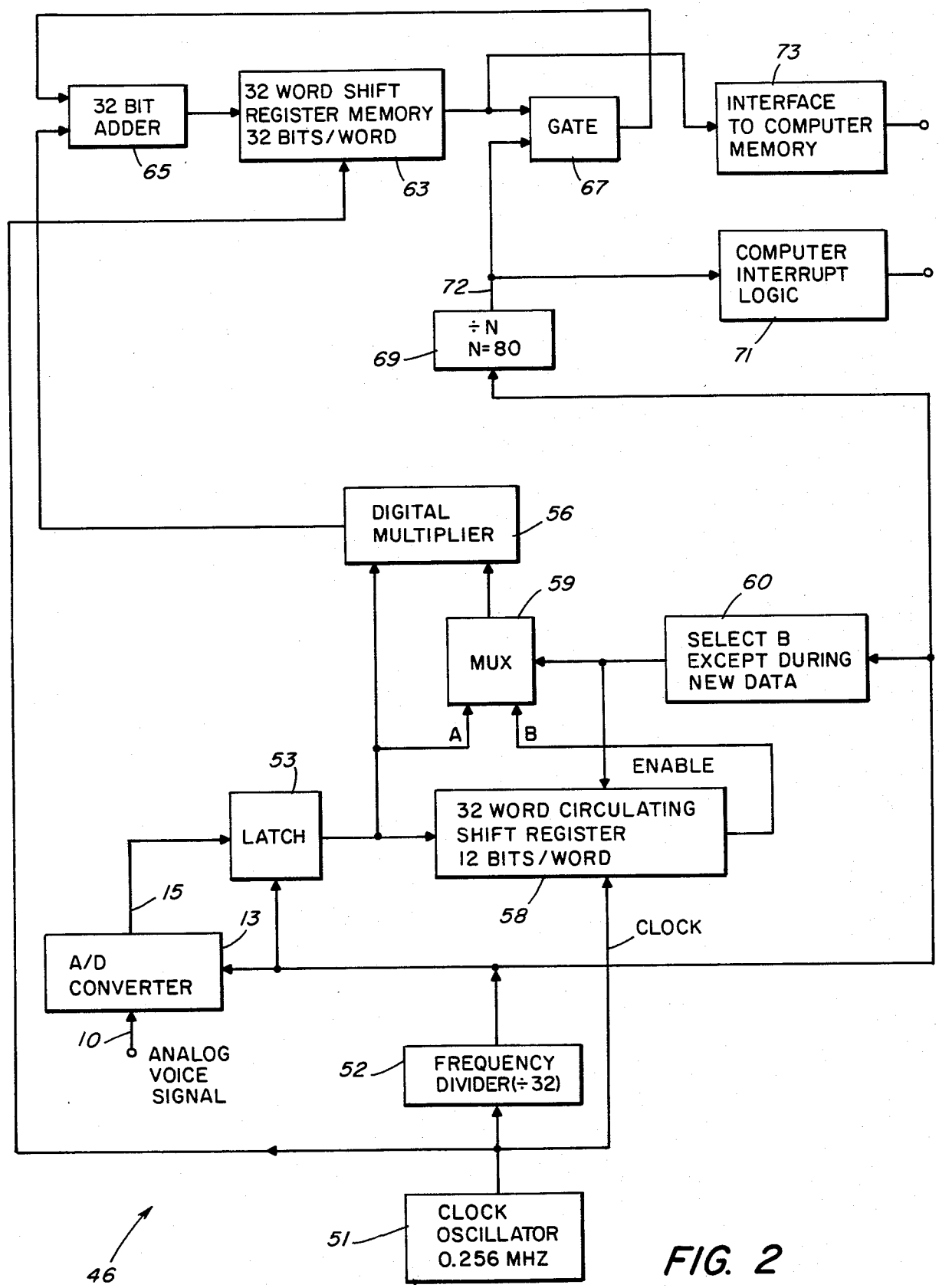
FIG. 2 is a schematic block diagram of electronic apparatus for performing certain preprocessing operations in the overall process illustrated in FIG. 1.

In the apparatus illustrated in FIG. 2, an autocorrelation function with its instrinsic averaging is performed digitally on the digital data stream generated by the analog-to-digital converter 13 operating on the incoming analog audio data over line 10, generally a voice signal. The converter 13 provides a digital input signal over lines 15. The digital processing functions, as well as the input analog-to-digital conversion, are timed under the control of a clock oscillator 51. The clock oscillator provides a basic timing signal of 256,000 pulses per second, and this signal is applied to a frequency divider 52 to obtain a second timing signal at 8,000 pulses per second. The slower timing signal controls the analog-to-digital converter 13 together with a latch register 53 which holds the twelve-bit results of the last conversion until the next conversion is completed.

The autocorrelation products are generated by a digital multiplier 56 which multiplies the number contained in register 53 by the output of a thirty-two word shift register 58. Shift register 58 is operated in a recirculating mode and is driven by the faster clock frequency, so that one complete circulation of the shift register data is accomplished for each analog-to-digital conversion. An input to shift register 58 is taken from register 53 once during each complete circulation cycle.

One input to the digital multiplier 56 is taken directly from the latch register 53 while the other input to the multiplier is taken (with one exception described below) from the current output of the shift register through a multiplexer 59. The multiplications are performed at the higher clock frequency.

Thus, each value obtained from the A/D conversion is multiplied with each of the preceding 31 conversion values. As will be understood by those skilled in the art, the signals thereby generated are equivalent to multiplying the input signal by itself, delayed in time by thirty-two different time increments (one of which is the zero delay). To produce the zero delay correlation, that is, the power of the signal, multiplexer 59 causes the current value of the latch register 53 to be multiplied by itself at the time each new value is being introduced into the shift register. This timing function is indicated at 60.

As will also be understood by those skilled in the art, the products from a single conversion, together with its 31 predecessors, will not be fairly representative of the energy distribution or spectrum over a reasonable sampling interval. Accordingly, the apparatus of FIG. 2 provides for averaging of these sets of products.

An accumulation process, which effects averaging, is provided by a thirty-two word shift register 63 which is interconnected with an adder 65 to form a set of thirty-two accumulators. Thus, each word can be recirculated after having been added to the corresponding increment from the digital multiplier. The circulation loop passes through a gate 67 which is controlled by a divide-by-N divider circuit 69 driven by the low frequency clock signal. The divider 69 divides the lower frequency clock by a factor which determines the number of instantaneous autocorrelation functions which are accumulated, and thus averaged, before the shift register 63 is read out.

In the illustrated example, eighty samples are accumulated before being read out. In other words, N for the divide-by-N divider circuit 69 is equal to eighty. After eighty conversion samples have thus been correlated and accumulated, the divider circuit 69 triggers a computer interrupt circuit 71 over a line 72. At this time, the contents of the shift register 63 are successively read into the computer memory through a suitable interface circuitry 73, the thirty-two successive words in the register being presented in ordered sequence to the computer through the interface 73. As will be understood by those skilled in the art, this data transfer from a peripheral unit, the autocorrelator preprocessor, to the computer may be typically performed by a direct memory access procedure. Predicated on an averaging of eighty samples, at an initial sampling rate of 8,000 samples per second, it will be seen that 100 averaged autocorrelation functions are provided to the computer every second.

While the shift register contents are being read out to the computer, the gate 67 is closed so that each of the words in the shift register is effectively reset to zero to permit the accumulation process to begin again.

Expressed in mathematical terms, the operation of the apparatus shown in FIG. 2 can be described as follows. Assuming that the analog-to-digital converter generates the time series S(t), where $t=0, T_o, 2T_o, \ldots,$ and $T_o$ is the sampling interval (1/8000 sec. in the illustrated embodiment), the illustrated digital correlation circuitry of FIG. 2 may be considered, ignoring start-up ambiguities, to compute the autocorrelation function $$a(j, t) = \sum_{k=0}^{79} S(t + kT_o) S(t + (k - j) T_o) \quad (1)$$

where $j=0, 1, 2 \ldots, 31$; and $t=80\ T_o, 160\ T_o, \ldots, 80n\ T_o, \ldots$. These autocorrelation functions correspond to the correlation output on lines 19 of FIG. 1.

Referring now to FIG. 3, the digital correlator operates continuously to transmit to the computer a series of data blocks at the rate of one complete autocorrelation function every ten milliseconds. This is indicated at 77 (FIG. 3). Each block of data represents the autocorrelation function derived from a corresponding subinterval of time. As noted above, the illustrated autocorrelation functions are provided to the computer at the rate of one hundred, 32-word functions per second. This analysis interval is referred to hereinafter as a "frame".

In the first illustrated embodiment, the processing of the autocorrelation function data is performed by an appropriately programmed, special purpose digital computer. The flow chart, which includes the function provided by the computer program is given in FIG. 3. Again, however, it should be pointed out that various of the steps could also be performed by hardware (as described below) rather than software and that likewise certain of the functions performed by apparatus of, for example, FIG. 2 could additionally be performed in software by a corresponding revision of the flow chart of FIG. 3.

Although the digital correlator of FIG. 2 performs some time-averaging of the autocorrelation functions generated on an instantaneous basis, the average autocorrelation functions read out to the computer may still contain some anomalous discontinuities or unevenness which might interfere with the orderly processing and evaluation of the samples. Accordingly, each block of data, that is, each autocorrelation function a(j,t) is first smoothed with respect to time. This is indicated in the flow chart of FIG. 3 at 78. The preferred smoothing process is one in which the smoothed autocorrelation output $a_s(j,t)$ is given by $$a_s(j,t) = C_0\, a(j,t) + C_1 a(j, t-T) + C_2 a(j, t-2T) \quad (2)$$

where a(j,t) is the unsmoothed input autocorrelation defined in Equation 1, $a_s(j,t)$ is the smoothed autocorrelation output, j denotes the delay time, t denotes real time, and T denotes the time interval between consecutively generated autocorrelation functions (frames), equal to 0.01 second in the preferred embodiment. The weighting functions $C_0, C_1, C_2$, are preferably chosen to be $\frac{1}{4}, \frac{1}{2}, \frac{1}{4}$ in the illustrated embodiment, although other values could be chosen. For example, a smoothing function approximating a Gaussian impulse response with a frequency cutoff of, say, 20 Hertz could have been implemented in the computer software. However, experiments indicate that the illustrated, easier to implement, smoothing function of Equation 2 provides satisfactory results. As indicated, the smoothing function is applied separately for each value j of delay.

It will become clear that subsequent analysis involves various operations on the short-term Fourier power spectrum of the speech signal and for reasons of hardware simplicity and processing speed, the transformation of the autocorrelation function to the frequency domain is carried out in eight-bit arithmetic in the illustrated embodiment. At the high end of the band pass, near three kilohertz, the spectral power density decreases to a level at which resolution is inadequate in eight-bit quantities. Therefore, the system frequency response is tilted at a rising rate of 6db per octave. This is indicated at 79. This high frequency emphasis is accomplished by taking the second derivative of the autocorrelation function with respect to its argument, i.e., the time delay or lag. The derivative operation is $$b(j,t) = -a(j+1,t) + 2a(j,t) - a(j-1,t) \quad (3)$$

To evaluate the derivative for $j=0$, it is assumed that the autocorrelation function is symmetrical about 0, so that $a(-j,t) = a(+j,t)$. Also, there is no data for $a(32)$ so the derivative at $j=31$ is taken to be the same as the derivative when $j=30$.

As indicated in the flow chart of FIG. 3, the next step in the analysis procedure, after high frequency emphasis, is to estimate the signal power in the current frame interval by finding the peak absolute value of the autocorrelation. The power estimate, $P(t)$, is $$P(t) = \max_i |b(i,t)| \quad (4)$$

In order to prepare the autocorrelation for the eight-bit spectrum analysis, the smoothed autocorrelation function is block normalized with respect to $P(t)$ (at 80) and the most significant eight bits of each normalized value are input to the spectrum analysis hardware. The normalized (and smoothed) autocorrelation function is, therefore:

$$c(j,t) = 127 \, b(j,t)/P(t). \quad (5)$$

As indicated at 81, a cosine Fourier transform is then applied to each time smoothed, frequency emphasized, normalized autocorrelation function, $c(j,t)$, to generate a 31 point power spectrum. The matrix of cosine values is given by:

$$S(i,j) = 126 g(i) \, (\cos (2\pi i/8000) f(j)), \, j=0, 1, 2, \ldots, 31 \quad (6)$$

where $S(i,j)$ is the spectral energy in a band centered at $f(j)$ Hz, at time $t$; $g(i) = \frac{1}{2}(1 + \cos 2\pi i/63)$ is the (Hamming) window function envelope to reduce side lobes; and $$f(j) = 30 + 1000 \, (0.0552j + 0.438) 1/0.63 \, Hz; \, j=0, 1, 2, \ldots, 31 \quad (7)$$

which are the analysis frequencies equally spaced on the so-called "mel" curve of subjective musical pitch. As will be understood, this corresponds to a subjective pitch (mel scale) frequency-axis spacing for frequencies in the bandwidth of a typical communication channel of about 300–3500 Hertz.

Since the spectrum analysis requires summation over lags from $-31$ to $+31$, by making the assumption that the autocorrelation is symmetric about zero, only the positive values of $j$ are required. However, to avoid counting the lag zero term twice, the cosign matrix is adjusted so that $$S(0,j) = 126/2 = 63, \text{ for all } j \quad (8)$$

Thus the computed power spectrum is given by $$S'(j,t) = \left| \sum_{i=0}^{31} a(i,t) S(i,j) \right|, j = 0, 1, \ldots, 31 \quad (9)$$

where the jth result corresponds to the frequency $f(j)$.

As will also be understood, each point or value within each spectrum represents a corresponding band of frequencies. While this Fourier transform can be performed completely within the conventional computer hardware, the process may be speeded considerably if an external hardware multiplier or Fast Fourier Transform (FFT) peripheral device is utilized. The construction and operation of such modules are well known in the art, however, and are not described in detail herein. Advantageously built into the hardware Fast Fourier Transform peripheral device is the frequency smoothing function wherein each of the spectra are smoothed in frequency according to the preferred (Hamming) window weighting function $g(i)$ defined above. This is indicated at 83 of block 85 which corresponds to the hardware Fourier transform implementation.

If the background noise is significant, an estimate of the power spectrum of the background noise should be subtracted from $S'(j,t)$ at this stage. The frame or frames selected to represent the noise should not contain any speech signals. The optimum rule for selecting noise frame intervals will vary with the application. If the talker is engaged in two-way communication, for example, with a machine controlled by the speech recognition apparatus, it is convenient, for example, to chose a frame arbitrarily in the interval immediately after the machine has finished speaking by its voice response unit. In less constrained situations, the noise frame may be found by choosing a frame of a minimum amplitude during the past one or two seconds of audio input.

As successive smoothed power spectra are received from the Fast Fourier Transform peripheral 85, a communications channel equalization is obtained by determining a (generally different) peak power spectrum envelope for the spectra from peripheral 85, and modifying the output of the Fast Fourier Transform apparatus accordingly, as described below. Each newly generated peak amplitude spectrum $p(j, t)$, corresponding to and updated by an incoming windowed power spectrum $S'(j, t)$, where $j$ is indexed over the plural frequency bands of the spectrum, is the result of a fast attack, slow decay, peak detecting function for each of the spectrum channels or bands. The windowed power spectra are normalized with respect to the respective terms of the corresponding peak amplitude spectrum. This is indicated at 87, 89, 91.

According to the illustrated embodiment, the values of the "old" peak amplitude spectrum $p(j, t-T)$, determined prior to receiving a new windowed spectrum are compared on a frequency band by frequency band basis with the new incoming spectrum $S'(j, t)$. The new peak spectrum $p(j,t)$ is then generated according to the following rules. The power amplitude in each band of the "old" peak amplitude spectrum is multiplied by a fixed fraction, for example, 1023/1024, in the illustrated example. This corresponds to the slow decay portion of the peak detecting function. If the power amplitude in a frequency band $j$ of the incoming spectrum $S'(j,t)$ is greater than the power amplitude in the corresponding frequency band of the decayed peak amplitude spectrum, then the decayed peak amplitude spectrum value for that (those) frequency band(s) is (are) replaced by the spectrum value of the corresponding band of the incoming windowed spectrum. This corresponds to the fast attack portion of the peak detecting function. Mathematically, the peak detecting function can be expressed as $$p(j,t) = \max{p(j, t-T)\cdot(1-E); P(t)\cdot S'(j,t)} \quad j=0,1,\ldots,31 \quad (10)$$

where j is indexed over each of the frequency bands, p(j,t) is the resulting peak spectrum, p(j, t−T) is the "old" or previous peak spectrum, S'(j,t) is the new incoming partially processed power spectrum, P(t) is the power estimate at time t, and E is the decay parameter.

According to equation 10, the peak spectrum normally decays, absent a higher value spectrum input, by a factor of 1−E. Typically E equals 1/1024. It may however be undesirable to permit decay of the peak spectrum during intervals of silence, particularly if no rapid change in the communication channel or voice characteristics is expected. To define the silence frame, the same method employed to choose background noise frames can be employed. The amplitudes (square root of P(t)) of the past 128 frames are inspected, and the minimum value found. If the amplitude of the current frame is less than four times this minimum, the current frame is determined to be silence and the value "zero" is substituted for the value 1/1024, for E.

After the peak spectrum is generated the resulting peak amplitude spectrum p(j,t) is frequency smoothed at 89 by averaging each frequency band peak value with peak values corresponding to adjacent frequencies of the newly generated peak spectra, the width of the overall band of frequencies contributing to the average value being approximately equal to the typical frequency separation between formant frequencies. As will be understood by those skilled in the speech recognition art, this separation is in the order of about 1000 Hz. By averaging in this particular way, the useful information in the spectra, that is, the local variations revealing formant resonances are retained whereas overall or gross emphasis in the frequency spectrum is suppressed. According to the preferred embodiment the peak spectrum is smoothed with respect to frequency by a moving average function covering seven adjacent frequency bands. The averaging function is:

$$e(j,t) = h(j) \sum_{k=j-3}^{j+3} p(k,t) \quad (11)$$

At the ends of the passband, p(k,t) is taken to be 0, for k less than 0 and k greater than 31. The normalizing envelope h(j) takes into account the number of valid data elements actually summed: thus, h(0)=7/4, h(1)=7/5, h(2)=7/6, h(3)=1, . . . , h(28)=1, h(29)=7/6, h(30)=7/5, and h(31)=7/4. The resulting smoothed peak amplitude spectrum e(j,t) is then employed to normalize and frequency equalize the just received power spectrum, S'(j,t), by dividing the amplitude value of each frequency band of the incoming smoothed spectrum S'(j,t), by the corresponding frequency band value in the smoothed speak spectrum e(j,t). Mathematically, this corresponds to $$s_n(j,t) = (S'(j,t) / e(j,t)) \; 32767 \quad (12)$$

where $s_n(f,t)$ is the peak-normalized, smoothed power spectrum and j is indexed over each of the frequency bands. This step is indicated at 91. There results a sequence of frequency equalized and normalized short-term power spectra which emphasizes changes in the frequency content of the incoming audio signals while suppressing any generalized long-term frequency emphasis or distortion. This method of frequency compensation has been found to be highly advantageous in the recognition of speech signals transmitted over frequency distorting communication links such as telephone lines, in comparison to the more usual systems of frequency compensation in which the basis for compensation is the average power level, either in the whole signal or in each respective frequency band.

It is useful to point out that, while successive spectra have been variously processed and equalized, the data representing the incoming audio signals still comprises spectra occurring at a rate of one hundred per second.

The normalized and frequency equalized spectra, indicated at 91, are subjected to an amplitude transformation, indicated at 93, which effects a non-linear scaling of the spectrum amplitude values. Designating the individual equalized and normalized spectra as $s_n(j,t)$ (from Equation 12) where j indexes the different frequency bands of the spectrum and t denotes real time, the non-linear scaled spectrum x(j,t) is defined by the linear fraction function $$x(j,t) = 128 \frac{s_n(j,t) - A}{s_n(j,t) + A} \quad j = 0, 1, \ldots, 30 \quad (13)$$

where A is the average value of the spectrum $s_n(j,t)$ over j=0 to 31, and is defined as follows:

$$A = \frac{1}{32} \sum_{j=0}^{31} s_n(j,t) \quad (14)$$

where j indexes over the frequency bands of the power spectrum.

The thirty-first term of the spectrum is replaced by the logarithm of A so that $$x(31,t) = 16 \log_2 A \quad (15)$$

This scaling function (Eq. 13) produces a soft threshold and gradual saturation effect for spectral intensities which deviate greatly from the short-term average A. Mathematically, for intensities near the average, the function is approximately linear; for intensities further from the average, it is approximately logarithmic; and at the extreme values of intensity, it is substantially constant. On a logarithmic scale, the function x(j,t) is symmetric about zero and the function exhibits threshold and saturation behavior that is suggestive of an auditory nerve firing-rate function. In practice, the overall recognition system performs significantly better with this particular non-linear scaling function than it does with either a linear or a logarithmic scaling of the spectrum amplitudes.

There is thus generated a sequence of amplitude transformed, frequency-response equalized, normalized, short-term power spectra x(j,t) where t equals 0.01, 0.02, 0.03, 0.04, . . . , seconds and j=0, . . . , 30 (corresponding to the frequency bands of the generated power spectra). Thirty-two words are provided for each spectrum; and the value of A (Equation 15), the average value of the spectrum values, is stored as the thirty-second word. The amplitude transformed, short-term power spectra hereinafter referred to as "frames", are stored, as indicated at 95, in a first-in, first-out circulating memory having storage capacity, in the illustrated embodiment, for 256 thirty-two-word spectra. There is thus made available for analysis, in the illustrated embodiment, 2.56 seconds of the audio input signal. This storage capacity provides the recognition system with the flexibility, if required, to select spectra at different real times, for analysis and evaluation and thus with the ability to go forward and backward in time as the analysis requires.

Thus, the frames for the last 2.56 seconds are stored in the circulating memory and are available as needed. In operation, in the illustrated embodiment, each frame is stored for 2.56 seconds. Thus, a frame, which enters the circulating memory at time $t_1$, is lost or shifted from the memory 2.56 seconds later as a new frame, corresponding to a time $t_1 + 2.56$, is stored.

The frames passing through the circulatory memory are compared, preferably in real time, against a known vocabulary of words to determine and identify keywords in the input data. Each vocabulary word is represented by a template pattern statistically representing a plurality of processed power spectra formed into plural non-overlapping multi-frame (preferably three frames) design set or target patterns. These patterns are preferably selected to best represent significant acoustical events of the vocabulary words and are stored at 99.

The spectra forming the design set patterns are generated for the words spoken in various contexts using the same system described hereinabove (FIG. 3) for processing the continuous unknown speech input over line 10.

Thus, each vocabulary word has associated with it a generally plural sequence of design set patterns, $P(i)_1$, $P(i)_2$, ..., which represent, in a domain of short-term power spectra, one designation of that ith keyword. The collection of design set patterns for each keyword form the statistical basis from which the target patterns are generated.

In the illustrated embodiment of the invention, the design set patterns $P(i)_j$ can each be considered a 96 element array comprising three selected frames arranged in a series sequence. The frames forming the pattern should preferably be spaced at least 30 milliseconds apart to avoid spurious correlation due to time domain smoothing. In other embodiments of the invention, other sampling strategies can be implemented for choosing the frames; however, the preferred strategy is to select frames spaced by a constant time duration, preferably 30 milliseconds, and to space the non-overlapping design set patterns throughout the time interval defining the keyword. Thus, a first design set pattern $P_1$ corresponds to a portion of a keyword near its beginning, a second pattern $P_2$ corresponds to a portion later in time, etc., and the patterns $P_1, P_2, \ldots$ form the statistical basis for the series or sequence of target patterns, the word template, against which the incoming audio data will be matched. The target patterns $t_1, t_2, \ldots$, each comprise the statistical data, generated from corresponding $P(i)_j$ by assuming the $P(i)_j$ are comprised of independent Gaussian variables, which enable a likelihood statistic to be generated between incoming frames, defined below, and the target patterns. Thus, the target patterns consist of an array wherein the entries comprise the mean, standard deviation and area normalization factor for a corresponding collection of design set pattern array entries. A more refined likelihood statistic is described below.

It will be obvious to those skilled in the art that substantially all keywords will have more than one contextual and/or regional pronounciation and hence more than one "spelling" of design set patterns. Thus, a vocabulary keyword having the patterned spelling $P_1$, $P_2$ ... referred to above, can in actuality be generally expressed as $p(i)_1, p(i)_2, \ldots i = 1, 2, \ldots, M$ where each of the $p(i)_j$ are possible alternative descriptions of the jth class of design set patterns, there being a total of M different spellings for the word.

The target patterns $t_1, t_2, \ldots, t_i, \ldots$, in the most general sense, therefore, each represent plural alternative statistical spellings for $i^{th}$ group or class of design set patterns. In the illustrated embodiment described herein, the term "target pattern" is thus used in the most general sense and each target pattern may therefore have more than one permissible alternative "statistical spelling."

Preprocessing of the incoming unknown audio signals and the audio forming the reference patterns is now complete.

Processing the Stored Spectra

Referring to FIG. 3, the stored spectra, or frames, at 95, representing the incoming continuous audio data, are compared with the stored template of target patterns indicated at 99, representing keywords of the vocabulary according to the following method.

For each 10 millisecond frame, a pattern for comparison with the stored reference patterns is formed at 97 by adjoining the current spectrum vector $s(j,t)$, the spectrum $s(j,t-0.03)$ from three frames ago, and the spectrum $s(j,t-0.06)$ from six frames ago, to form a 96 element pattern:

$$x(j,t) = \begin{cases} s(j,t-.06), j = 0, \ldots, 31 \\ s(j-32, t-.03), j = 32, \ldots, 63 \\ s(j-64, t), j = 64, \ldots, 95 \end{cases}$$

Each thus formed multi-frame pattern can be transformed according to the procedures described in, for example, U.S. Pat. Nos. 4,241,329, 4,227,176, and 4,227,177. These transformations, however, while useful in connection with the invention herein, do not form a part of the invention and it would be obvious, to one skilled in the art, how to adapt the teachings of the above cited United States patents to the method and apparatus taught herein. Thus, in the illustrated embodiment, the transformations can reduce cross-correlation and decrease dimensionality, and enhance the separation betweeen target pattern classes. The multi-frame patterns comprising the equalized spectra are applied as inputs to a statistical likelihood calculation, indicated at 100, which measures the probability that the (or a sequence of) transformed pattern(s) matches a (or a sequence of) target pattern(s).

Statistical Likelihood Calculation

The thus formed multi-frame patterns $x(j,t)$ are applied as inputs to the statistical likelihood calculation. This processor, as noted above, provides a measure of the probability with which each of the successively presented, multi-frame patterns (which in sequence represent the unknown input speech) matches each of the target patterns of the keyword templates in the machine's vocabulary. Typically, each datum representing a target pattern has a slightly skewed probability density, but nevertheless is well approximated, statistically, by a normal Gaussian distribution having a mean value $\overline{w}_{i,k}$ and a variance $\text{var}(i,k)$, where i is the sequential designation of the elements of the $k^{th}$ target pattern. The simplest implementation of the process assumes that the data associated with different values of i and k are uncorrelated so that the joint probability density for the datum x belonging to target pattern k is (logarithmically)

$$L(x|k) = p(x,k) = \sum_i \tfrac{1}{2} \ln 2 (\text{var}(i,k)) - \frac{\tfrac{1}{2}(x_i - (\overline{w}_{i,k})^2)}{\text{var}(i,k)} \quad (9)$$

Since the logarithm is a monotonic function, this statistic is sufficient to determine whether the probability of a match with any one target pattern of a keyword template is greater than or less than the probability of a match with some other vocabulary target pattern, or alternatively whether the probability of a match with a particular pattern exceeds a predetermined minimum level. Each input multi-frame pattern has its statistical likelihood $L(x|k)$ calculated for all of the target patterns of the keyword templates of the vocabulary. The resulting likelihood statistics $L(x|k)$ are interpreted as the relative likelihood of occurrence of the target pattern named k at time t, the time at which pattern x occurs.

As will be well understood by those skilled in the art, the ranking of these likelihood statistics constitutes the speech recognition insofar as it can be performed from a single target pattern. These likelihood statistics can be utilized in various ways in an overall system, depending upon the ultimate function to be performed.

While, a Gaussian distribution can be used for the probability model, (see e.g. U.S. Pat. Nos. 4,241,329; 4,227,176; and 4,227,177, referred to above), the Laplace distribution $$p(x) = (1/\sqrt{2}\, s') \exp -(\sqrt{2}\, |x - m|/s')$$

(where m is the statistical mean and s' the standard deviation of the variable x) requires less computation and has been found to perform nearly as well as the Guassian distribution in, for example, the talker independent, isolated word recognition method described in U.S. Pat. No. 4,038,503. The degree of similarity $L(x|k)$ between an unknown input pattern x and the kth stored reference pattern is proportional to the logarithm of the probability and is estimated at 100 by the following formula:

$$L(x|k) = \sum_{i=1}^{96} \frac{|x_i - u_{ik}|}{s'_{ik}} + A_k \quad (17)$$

where $A_k = \tfrac{1}{2} \sum_{i=1}^{96} \ln s'_{ik}$

In order to combine the likelihood scores L of a sequence of patterns to form the likelihood score of a spoken word or phrase, the score $L(x|k)$ for each frame is adjusted by subtracting the best (smallest) score of all the reference patterns for that frame, as follows:

$$L'(x|k) = L(x|k) - \min_i L(x|i) \quad (18)$$

Thus the best-fitting pattern on each frame will have a score of zero. The adjusted scores for a hypothesized sequence of reference patterns can be accumulated from frame to frame to obtain a sequence score related directly to the probability that a decision in favor of the indicated sequence would be the correct decision.

Comparison of unknown input spectrum patterns against stored known patterns is accomplished by computing the function $$q = \sum_{i=1}^{96} \overline{s}_{ik} |x_i - u_{ik}| + c_k \quad (19)$$

(where $\overline{s}_{ik}$ equals $1/s'_{ik}$) for the kth reference pattern. In a normal software implemented computation, the following instructions would be executed to compute the algebraic function $\overline{s}|x-u|$ (of Equation 19):

1. compute $x-u$
2. test the sign of $x-u$
3. if $x-u$ is negative, negate to form the absolute value
4. multiply by $\overline{s}$
5. add the result into an accumulator In a typical speech recognition system having a 20-word vocabulary, there would be about 222 different reference patterns. The number of steps required to evaluate them is then $5 \times 96 \times 222 = 106560$ steps, not including overhead operations, and this must be done in less than 10 milliseconds in order to keep up with the real time spectrum frame rate. The processor must therefore be capable of executing nearly 11 million instructions per second just to evaluate the likelihood functions. In view of the necessary speed, a special purpose likelihood function hardware module 200 (FIG. 5), which is compatible with a system Vector Processor as disclosed in U.S. Pat. No. 4,228,498, is employed.

In this special purpose hardware, the five steps listed above are performed simultaneously with two sets of the arguments $\overline{s}$, x, u; so that in effect ten instructions are performed in the time it normally takes to execute one instruction. Since the basic Vector Processor operates at a rate of 8 million instructions per second, the effective computation rate for the likelihood function becomes about 80 million instructions per second with the special purpose hardware module 200 being employed.

Figure 5:
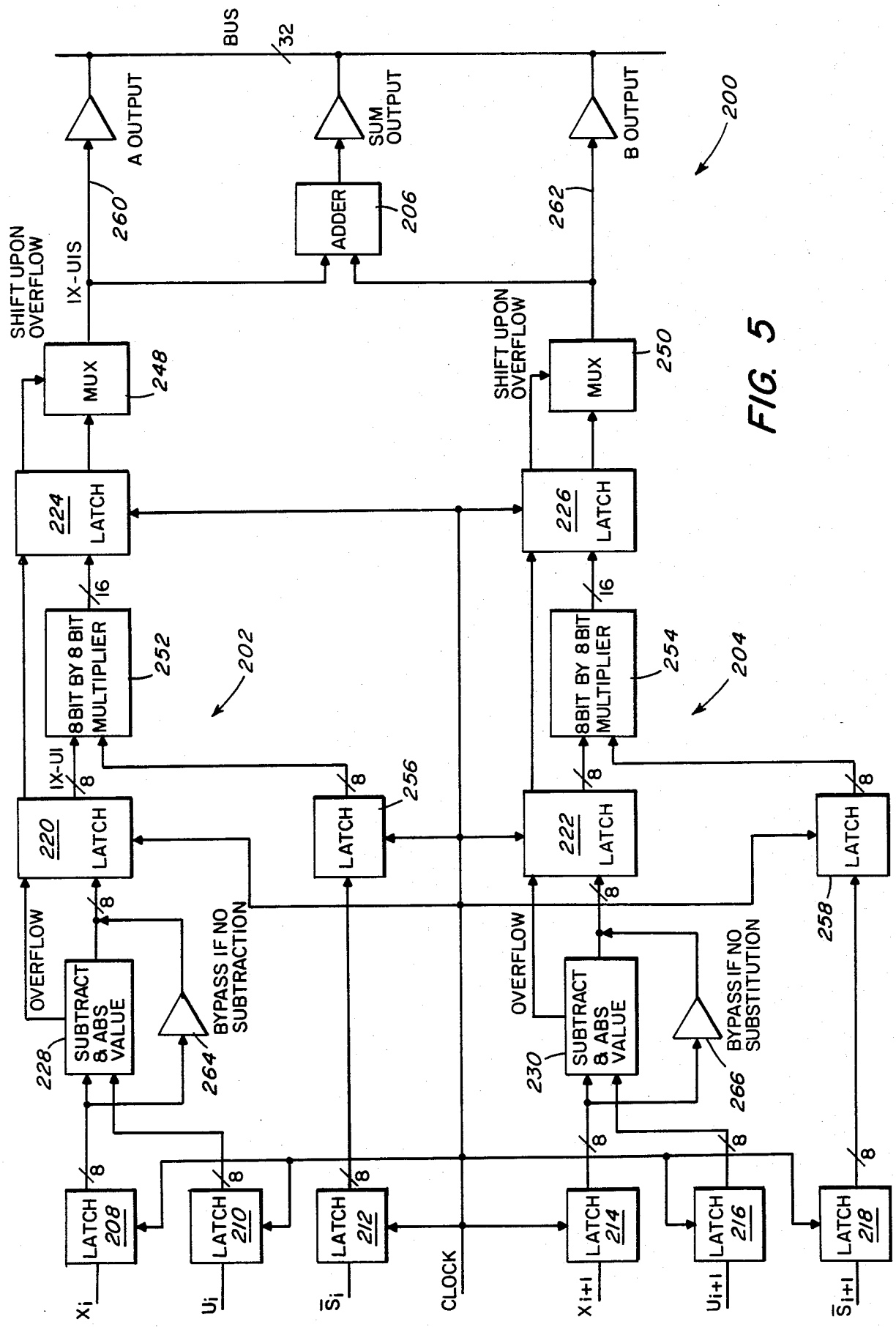
FIG. 5 is an electrical block diagram of a likelihood function processor according to a preferred embodiment of the invention.

Hardware module 200, referring to FIG. 5, employs a combination of hardware pipelining and parallel processing to provide the simultaneous execution of the ten steps. Two identical sections 202, 204 each perform five arithmetic steps upon the independent input data arguments and the two results are combined by an adder 206 connected to their outputs. The accumulation of the summations from adder 206 form the summation from 1 to 96 of Equation 19 and is handled by the arithmetic unit of the standard Vector Processor described in U.S. Pat. No 4,288,498.

In operation, pipelining registers hold the intermediate data at the following stages of the processing:

1. input arguments (clocked registers 208, 210, 212, 214, 216, 218)
2. absolute value of $x-u$ (clocked registers 220, 222)

3. output of multiplier (clocked registers 224, 226)

Figure 6:
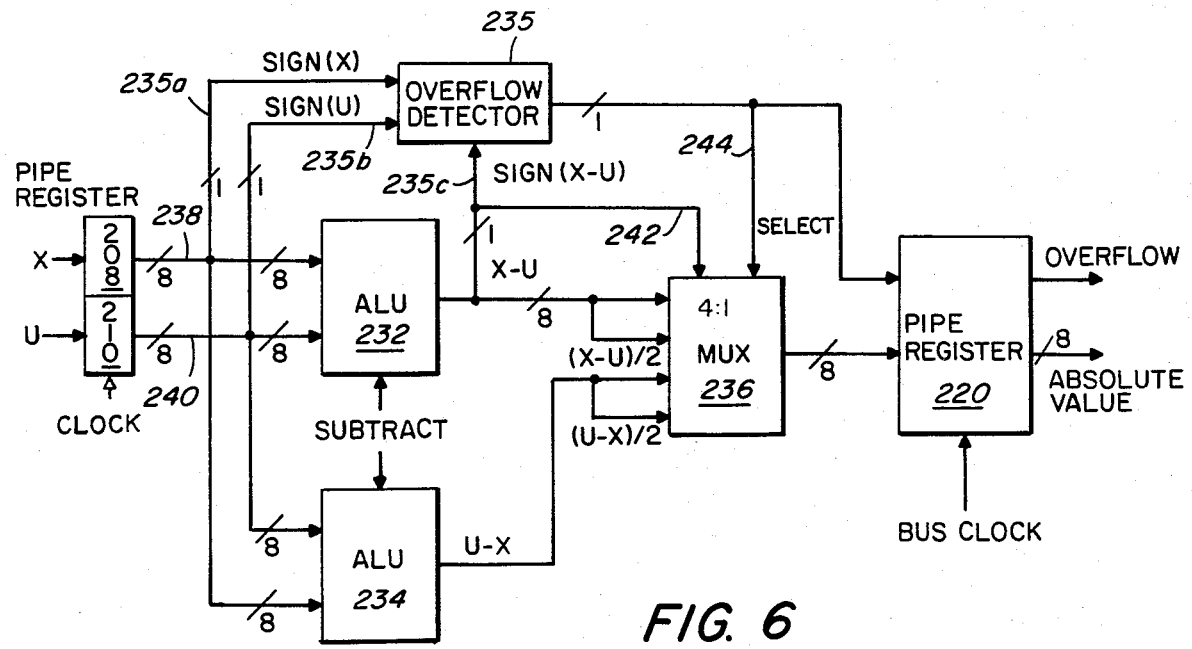
FIG. 6 is an electrical schematic block diagram of the subtract and absolute value circuit according to a preferred embodiment of the invention.

With the input data held in clocked registers 208-218, the magnitude of x−u is determined by subtract and absolute value elements 228, 230. Referring to FIG. 6, the subtraction and absolute value elements 228, 230, each contain first and second subtracters 232, 234, one to find x−u and the other to find u−x, and a multiplexer 236 to select the positive result. The input arguments x and u over lines 238, 240 from registers 208, 210 respectively, are 8-bit numbers ranging from −128 to +127. Since the difference output of the 8-bit subtracter may overflow to 9 bits (for example, (127−(−128)=255), extra circuitry is needed and employed to handle an arithmetic overflow condition. (The condition is determined by an overflow detector 235 whose inputs are the sign of "x" (over a line 235a), the sign of "u" (over a line 235b) and the sign of "x−u" (over a line 235c).)

The overflow detectors, referring to FIG. 7, are, in this illustrative embodiment, combinatorial circuits having three-input AND gates 268, 270, and an OR gate 272. The truth table of FIG. 8 defines the overflow condition as a function of its inputs.

The overflow condition is handled by providing four choices in the multiplexer 236, the element which selects the positive subtractor output. The choices are defined by the binary levels on lines 242 and 244. The level on line 242 represents the sign of x−u. The sign on line 244 represents an overflow if "1". Thus the choices are:

| line 242 | line 244 |   |
|---|---|---|
| 0 | 0 | select the subtracter 232 output |
| 1 | 0 | select the subtracter 234 output |
| 0 | 1 | select the subtracter 232 shifted down 1 bit |
| 1 | 1 | select the subtracter 234 shifted down 1 bit |

The multiplexer is thus controlled to act like an 8-pole, 4-position electrical switch. The "shift" operation is performed combinatorially by connecting (gating) the subtracter outputs to the appropriate multiplexer inputs. The shift has the effect of dividing arithmetically by two.

If an overflow has occurred during the subtraction, the output of the multiplexer will be the output of a subtractor divided by two. It is therefore necessary to remember that condition later in the computation so that the final result can be multiplied by two, to restore the correct scale factor. This restoration occurs at the output of the multiplier after the final pipelining register. Therefore an extra bit is provided in the pipeline registers 220, 222, 224, 226 to control second multiplexers 248, 250 which shift, respectively, the multiplicative product of an 8×8 bit multiplier 252, 254 up by one bit, to multiply by two, whenever the overflow bit is set (equal to "1"). The multiplication arithmetic is carried out in a standard commercial integrated circuit device, such as the TRW part number MPY-8-HJ, which accepts two 8-bit numbers and outputs their product.

Multipliers 252, 254 thus produce the product of s̄ and |x−u| at each clock pulse (the value of s̄ being properly timed by the extra data registers 256, 258). The outputs of multipliers 252, 254 are buffered in registers 224, 226 and are output to the remaining circuit apparatus over lines 260, 262 and through adder 206.

The same special purpose hardware module 200 is also employed for computing the inner product of two vectors, as required in matrix multiplication. This is accomplished by gating circuits 264, 266 which permit bypassing, in the subtraction and absolute value circuit, of components 228, 230. In this mode of operation, the data "x" and "s̄" input buses are applied directly to the pipeline registers 220, 222, as the multiplier inputs.

Word-level Detection Processing

The "spelling" of a keyword, according to the preferred embodiment of the invention, is an ordered sequence of reference pattern names, or "phones," (the target patterns) together with a minimum and maximum dwell time (duration) associated with each phone in the spelling. Matching of the stream of unknown input patterns against a keyword spelling is performed by forcing each input pattern to belong to some phone of the spelling. The degree of "belonging" is measured by the likelihood score of the pattern relative to the phone. At each new input spectrum frame an entire "word score" is computed relative to each keyword spelling as follows.

Referring to FIG. 4, the current frame (corresponding to circle 402) is hypothesized to be the end of a keyword. The word score for each keyword of the vocabulary is then determined as follows. The first contribution to the word score is the likelihood score of the present input pattern relative to the final phoneme of the keyword spelling, or of the next previous phoneme, whichever is better (smaller).

The next frame backwards in time (corresponding to circle 404) is then examined. If the minimum dwell time of the current phone has not yet elapsed, then the contribution of the current (i.e. next previous) pattern is the better of (a) the likelihood score relative to the current phoneme or (b) the likelihood score relative to the next previous phoneme. This contribution is added to the partial word score. If the minimum dwell time has elapsed, the likelihood scores relative to the current and next previous phoneme are examined. If the next previous phoneme's score is better, then the next previous phoneme becomes the current phoneme (over one of paths 406) and its score is the one accumulated into the word score; and the minimum and maximum dwell times are reset. Otherwise, the current phone remains current, and its likelihood score is added into the word score. If the maximum dwell time for the current phoneme has elapsed, then a penalty is added into the word score and the next previous phoneme becomes the current phone. The analysis is finished when there is no next previous phoneme, and the final word score is the content of the word score accumulator divided by the number of frames from start to finish (i.e., the average likelihood score per frame relative to the spelling).

A detection threshold on word scores is set to establish a tradeoff between detection probability and false alarm probability. If the word score relative to any spelling is better than the threshold value, a detection at 420 is declared. If two or more detections occur within too short a time interval, arbitration logic selects the best of the overlapping detections.

Since the hypothesized "current" phoneme changes monotonically through the word spelling and never retreats to an earlier state, the above description of the word detection method can be recast as a dynamic programming problem.

The Dynamic Programming Approach

Figure 4A:
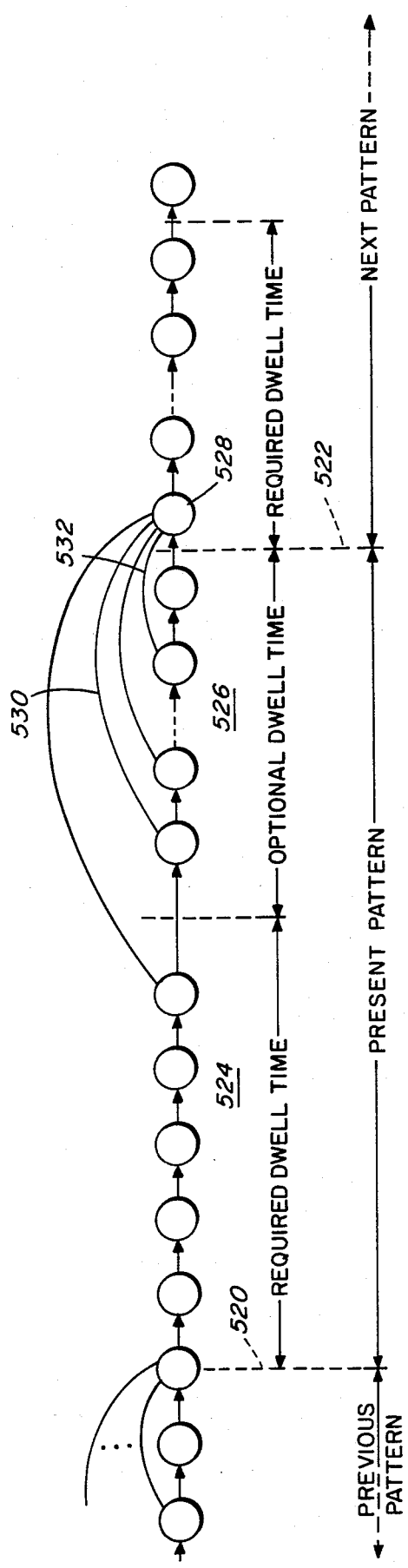
FIG. 4A is a graphical representation of the alignment process according to the dynamic programming method of the invention.

Referring to FIG. 4A, according to the dynamic programming approach, keyword recognition can be represented as the problem of finding an appropriate path through an abstract state space. In the figure, each circle represents a possible state (also designated a dwell time position or register) through which the decision making process can pass. The space between dashed vertical lines 520, 522 represents each of the hypothetical states in which the decision making process can pass in determining whether a pattern matches or does not match a current phoneme. This space is divided into a required dwell time portion 524 and an optional dwell time portion 526. The required dwell time portion is the minimum duration of the particular "current" phoneme or pattern. The optional dwell time portion represents the additional maximum duration of a pattern. Each of the circles within the optional or required dwell time portions represents one frame time of the continuum of formed frames and corresponds to the 0.01 second intervals from frame to frame. Thus, each circle identifies a hypothesized current phonetic position in a keyword spelling and, together with the number of (0.01 second) frames hypothesized to have elapsed since the current phoneme began, corresponding to the number of earlier "circles" or positions in that phoneme or target pattern, represents the present duration of the pattern. After a pattern (phoneme) has begun and the minimum dwell time interval has elapsed, there are several possible paths of advancing to the first node or position (circle) 528 of the next target pattern (phoneme). This depends upon when the decision to move to the next pattern (phoneme) of the spelling is made. These decision possibilities are represented in the figure by the several arrows leading to circle 528. A transition to the next pattern (phoneme), the beginning of which is represented by circle 528, might be made at any node or position during the optional dwell time of the current pattern (phoneme) or at the last node of the required dwell time interval.

The key word recognition method described in U.S. Pat. Nos. 4,241,329; 4,227,176; and 4,227,177, makes the transition at the first such node for which the likelihood score relative to the next pattern (phoneme) is better than the likelihood score relative to the current pattern (phoneme). That is, a frame matches the next phoneme or pattern better than the present phoneme or pattern. The total word score, however, is the average pattern (phoneme) score per frame (i.e., per node included in the path). This same "total score" definition applied to a word score up to the current node can be used to decide when to make the transition; that is, whether to make the transition to the next pattern at say a first opportunity, corresponding for example to a transition indicating line 530, or at a later time, corresponding to, for example, a transition indicating line 532. Optimally, one chooses that path into the next pattern (phoneme) for which the average score per node is best. Since the standard keyword method described in U.S. Pat. Nos. 4,241,329, 4,227,176, and 4,227,177, does not examine any of the potential paths after it has made the decision to move to the next pattern (phone), it may make a sub-optimal decision as measured by average score per node.

Accordingly, the present invention employs an average score per node strategy for keyword recognition, and a detection is recorded whenever the average score per mode for the "best ending mode" of the last pattern of a keyword exceeds a predetermined threshold.

The dynamic programming approach requires at each analysis time frame the likelihood score that some vocabulary word is just beginning (i.e., that some preceding word or other sound has just ended). In a closed vocabulary task, providing this score is a straightforward matter. However in the key word task, neither reference patterns for all expected sounds, nor definitions for all possible words are available.

Several strategies for providing an input score are possible. To illustrate these, certain features of the dynamic programming method need to be explained further. The method is implemented with an ordered array of accumulators $A(1), A(2), \ldots$ each of which stores a score corresponding to a particular sequence of patterns and pattern durations. The contents of the ith accumulator at time t analysis frames will be designated $A(i,t)$. The likelihood score at time t for the reference pattern associated with the ith accumulator will be denoted by $L(i,t)$. Then the recursion formula for an accumulator which does not correspond to the first frame (or beginning) of a target pattern is $$A(i,t) = L(i,t) + A(i-1, t-1).$$

The first accumulator $A(n,t)$ of the next target pattern is fed by the best (minimum) score of the available accumulators for the preceding pattern (i.e. those accumulators from which a transition can be made to the next pattern):

$$A(n,t) = L(n,t) + \min_{i=m, n-1} A(i, t-1)$$

In this way the optimum duration for the target pattern is found.

The word score for the key word to be detected is, as noted above, the average likelihood score per analysis frame. This is the difference between the output score at the last target pattern (the score that would be fed to the accumulator for a next pattern, if there were one) at the present analysis frame and the input score at the time the word started, divided by the duration of the word. The duration of the word associated with an accumulated word score, as well as the target pattern length, can be carried forward and updated from register to register.

The accumulator for the input score corresponding to the first register of the first pattern of a keyword is denoted by $A(0,t)$. The simplest input strategy is to use a linear ramp function of constant slope c as the input likelihood score to the keyword recognition process. The successive accumulator contents for this strategy are shown in the following table.

| Time t | Accumulator contents | | |
|---|---|---|---|
| | $A(0,t)$ | $A(1,t)$ | $A(2,t)\ldots$ |
| 0 | 0 | 0 | 0 |
| 1 | c | $L(1,1)$ | $L(2,1)$ |
| 2 | 2c | $L(1,2) + c$ | $L(2,2) + L(1,1)$ |
| 3 | 3c | $L(1,3) + 2c$ | $L(2,3) + L(1,2) + c$ |

At any time the number of additions done into each accumulator is the same for all accumulators, so there is no bias due to initialization. The effect of c can be seen by noting that if c is small, then A(1,t) tends to contain a better score than A(2,t), while if c is large then A(2,t) contains a better score. The result is that the optimum pattern duration found by the method is biased to be too long or short. Since the ramp function propogates through all the accumulators, the durations of all the patterns in the word may be similarly biased.

Instead of accumulating a constant ramp, the contents of the first accumulator can be recirculated adding not a constant but the likelihood score of the current signal relative to the first reference pattern of the desired keyword. Then all the remaining accumulator contents will be correct, to within a constant that is subtracted off when determining the word score per frame. This method is illustrated in the following table.

| Time | Accumulator contents | | |
|---|---|---|---|
| t | A(0,t) | A(1,t) | A(2,t)... |
| 0 | 0 | 0 | 0 |
| 1 | L(0,1) | L(1,1) | L(2,1) |
| 2 | L(0,2) + L(0,1) | L(1,2) + L(0,1) | L(2,2) + L(1,1) |
| 3 | L(0,3) + L(0,2) + L(0,1) | L(1,3) + L(0,2) + L(0,1) | L(2,3) + L(1,2) + L(0,1) |
| 4 | L(0,4) + L(0,3) + L(0,2) + L(0,1) | L(1,4) + L(0,3) + L(0,2) + L(0,1) | L(2,4) + L(1,3) + L(0,2) + L + (0,1) |

With this method the choice of optimum pattern durations for the second and following patterns of the key word are independent of the duration of the first pattern. On the other hand it is impossible to tell from the accumulator contents how long the first pattern should be. This fact is made evident in the above table by substituting $L(2,t) = L(1,t) = L(0,t)$. Then, although three accumulators have been provided and the pattern could have a duration of three analysis frames, all three of the accumulators always contain the same score and there is no unique minimum to choose. This problem affects only the estimation of the total word score and does not affect, for example, the classification of later patterns that go into the reference pattern statistics. The presently preferred embodiment employs this method with an arbitrary constant duration assigned to the first pattern of each key word.

Training of Reference Patterns

Figure 11:
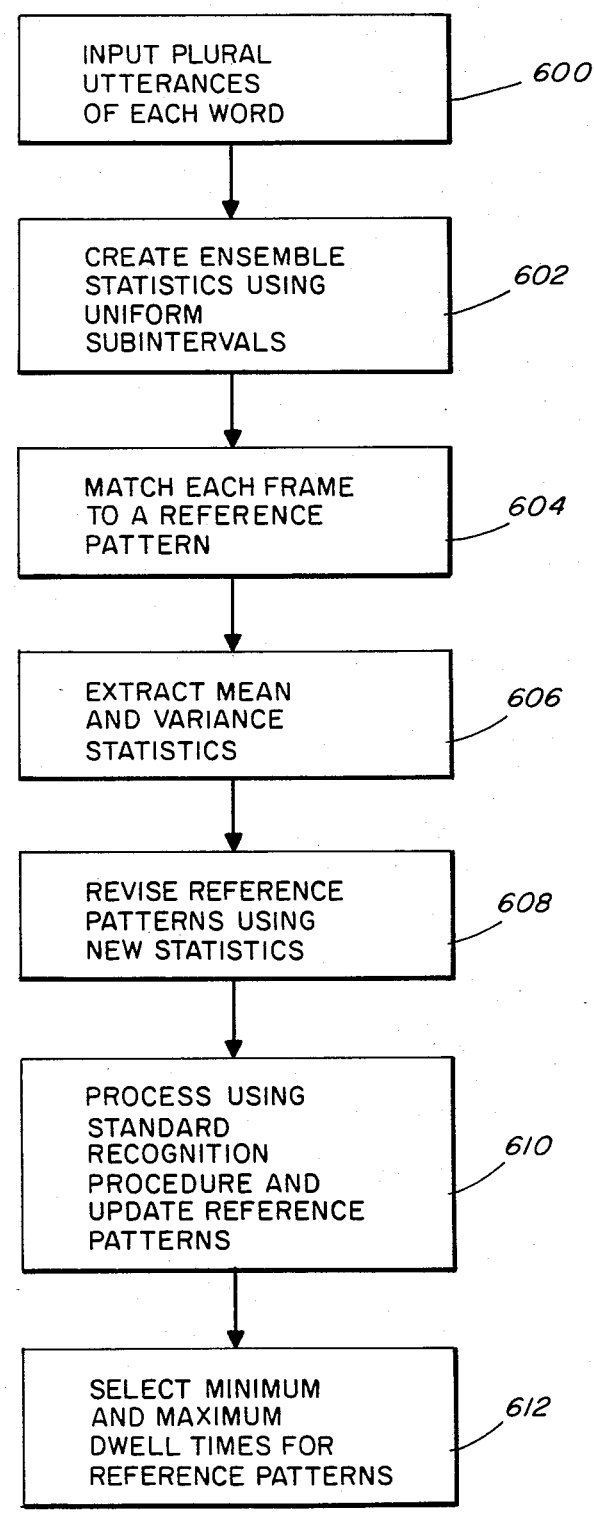
FIG. 11 is a flow diagram of the training method according to the invention.

To obtain sample means, u, and variances, s', for construction of reference patterns, a number of utterances of each vocabulary word are entered (at 600 (FIG. 11)) into the speech recognition system and the ensemble statistics of corresponding preprocessed spectrum frames are evaluated. Crucial to successful operation of the equipment is the choice of which input spectrum frames should correspond to which target or reference patterns.

In the absence of better information such as manually chosen significant acoustical phonemes for the input word, the time interval between the beginning and end of a spoken word is divided into a number of uniformly spaced subintervals. (at 602) Each of these subintervals is forced to correspond to a unique reference pattern. One or more three-frame patterns beginning in each interval are formed and classified according to the reference pattern associated with that interval. (at 604) Subsequent examples of the same vocabulary word are similarly divided into a like number of uniformly spaced intervals. The mean values and variances of the elements of the three-frame patterns extracted from correspondingly ordered intervals are accumulated over all available examples of the vocabulary word to form the set of reference patterns for that word. (at 606) The number of intervals (number of reference patterns) should be in the order of two or three per linguistic phoneme contained in the vocabulary word.

For best results the start and end of each keyword of the design set are marked through a procedure involving manual examination of the recorded audio waveforms and spectrum frames. To implement this procedure automatically it is necessary to have words spoken one at a time, bounded by silence, in order for the apparatus to find word boundaries accurately. The reference patterns may be initialized from one such sample of each word spoken in isolation, all variances being set to a convenient constant in the reference patterns. Thereafter the training material may comprise utterances typical of those to be recognized, with word boundaries as found by the recognition process.

After statistics from a suitable number of training utterances have been accumulated, the reference patterns so found replace the initial reference patterns. (at 608) A second pass through the training material is then made. (at 610) This time the words are divided into intervals on the basis of the decisions made by the recognition processor as in FIG. 3. Every three-frame input pattern (or one typical input pattern for each reference pattern) is associated with some reference pattern by the previously described pattern alignment method. Mean values and variances are accumulated a second time to form the final set of reference patterns derived in a manner wholly compatible with the method in which they are to be used by the recognition apparatus.

The minimum (required) and maximum (required plus optional) dwell times are preferably determined during the training process. According to the preferred embodiment of the invention, the apparatus is trained as described above, using several speakers. Further, as described above, the recognition process automatically determines, during the training procedure, pattern boundaries in accordance with the process described above. Thus boundaries are recorded and the dwell times for each of the apparatus identified keywords are stored.

At the end of a training run, the dwell times for each pattern are examined and the minimum and maximum dwell times for the pattern are chosen. (at 612) According to a preferred embodiment of the invention, a histogram of the dwell time is generated and the minimum and maximum dwell times are set at the twenty-fifth and seventy-fifth percentiles. This provides a high recognition accuracy while maintaining a low false alarm rate. Alternately, other choices of minimum and maximum dwell times can be chosen, there being a trade off between recognition accuracy and false alarm rate. Thus, if a low minimum dwell time and large maximum dwell time are chosen, a higher recognition accuracy will generally result at the cost of a correspondingly high false alarm rate.

The Realized System Using the Speech Recognition Method

As indicated previously, a presently preferred emobodiment of the invention was constructed in which the signal and data manipulation, beyond that performed by the preprocessor of FIG. 2, was implemented on and controlled by a Digital Equipment Corporation PDP-11 computer working in combination with the special purpose Vector Computer Processor such as that described in copending U.S. Pat. No. 4,228,498.

The detailed programs which provide the functions described in relation to the flow chart of FIG. 3 are set forth in the appendices (not printed herewith). The program printouts are in the MACRO-11 and FORTRAN languages provided by the Digital Equipment Corporation with its PDP-11 computers and in the machine language of the special purpose processor.

Appendix 1 is the operating program for an interactive system demonstration incorporating the speech recognition operation of the present invention and providing responses and instructions to the system operator. The interactive program itself forms no part of the present invention, and it is not described in detail in the specification. However, those skilled in the programming art will be able to follow how the interactive program may be employed both to generate design set patterns and to indicate detections of keywords. Appendix 2 is a flow chart of the overall interactive program.

The interactive program of Appendix 1 employs various subroutines and Appendix 3 consists of a printout of those subroutines.

In addition to the use of a computer programming implementation of the inventive method, a hardware implementation of the inventive method can be employed.

Figure 9:
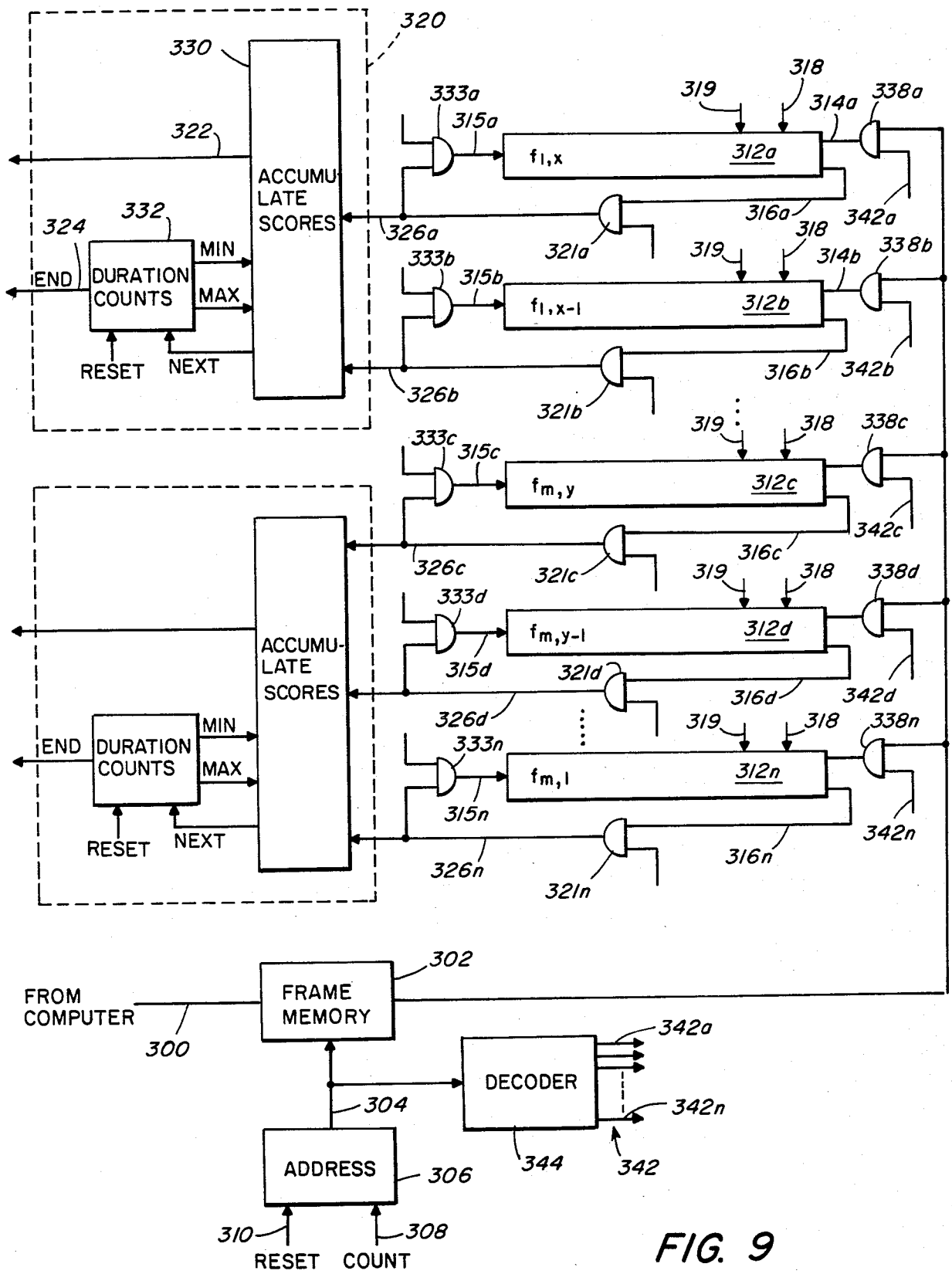
FIG. 9 is an electrical block diagram showing a sequential decoding pattern alignment circuit configuration according to a preferred particular embodiment of the invention.

Referring to FIG. 9, in one particular hardware embodiment of the invention, likelihood data from the likelihood data generating processor, is provided over lines 300 to a memory element 302. The memory 302 has sufficient storage capacity to record the likelihood scores of an input frame pattern relative to each of the target patterns of the vocabulary keywords being detected. This likelihood score input data is available over lines 300 from the processor, and is transferred to memory 302 at a high data rate and in a predetermined sequence. The data is stored within memory 302 according to the address output signals, over lines 304, from an address counter 306. The address counter 306 is incremented by pulse signals, synchronous with the data over lines 300, over a count line 308 and is reset to an initial predetermined address by a reset signal over a line 310.

The illustrated embodiment of FIG. 9 further has target pattern shift register memories 312(a), 312(b), . . . 312(n), memories 312 each being capable of storing likelihood score data for each frame, of the previous 2.56 seconds of processed audio, relative to a particular target pattern. The memories 312 are forward-backward shift registers which can be loaded with data over input lines 314 (in the backward shift mode) or over input lines 315 (in the forward shift mode). The output of each shift register memory 312 employed herein is available over output lines 316 as memory data is shifted in the "forward" direction.

In operation, a said memory 312, at each (forward) clock pulse over a line 318, shifts the contents of the register one data location "forward", that is, closer to the output over lines 316. Correspondingly, each memory 312, at each (backward) clock pulse over a line 319, shifts its contents one position "backward", that is, closer to the input line 315. Each memory, in the illustrated embodiment, has 256 positions for storing the 2.56 seconds of likelihood score data.

The output of each memory 312 over lines 316, respectively, is connected to controlled comparison circuits 320 through gating elements 321. The comparison circuits 320, which are described in greater detail in connection with FIG. 10, each have as outputs, an accumulated, normalized word score over lines 322, and a word score accumulation complete signal over lines 324. When the word score accumulation complete signal is available over all of the lines 324, that is from each comparison circuit 320, corresponding to the completion of keyword recognition processing, according to the method described above, the keyword is examined to determine (a) whether, for that present frame, the normalized word score exceeds a predetermined threshold level, and (b) whether those word(s) exceeding the threshold level should then be considered for further postdecision processing.

There is one comparison circuit 320 for each keyword in the vocabulary. Each comparison circuit 320 thus has as its input, over lines 326, the outputs of each of those memories 312 which correspond to the target patterns of that keyword. As described in more detail below, the comparison circuit, consisting of a multiple comparison multiplexing element 330 and a duration count process control element 332, determines the normalized accumulated word score for the hypothesis that the keyword ends at the then "present" frame time.

The illustrated shift register memories 312 are configured for either a recirculating "forward" shift mode or a non-recirculating "backward" shift mode. In the recirculating forward mode configuration, the shift register memories 312 receive their inputs over lines 315. The inputs are gated into memories 312 through gate elements 333 and 321. In the non-recirculating mode of operation the memory receives its input over line 314 through a gate element 338 from the memory 302.

In operation, initially, the memories are "backwards" loaded through gates 338 to full capacity, that is, 256 likelihood scores in each memory. This input data is obtained from the memory 302 according to the sequential counts from address counter 306. In accordance with the address count, the gates 338 are selectively enabled by the selectively applied enabling signals over lines 342. The enabling signal over lines 342 are sequenced through the gates 338 by a 1 to n decoding circuit 344 whereby the output of the memory 302 is stored in the corresponding one of memories 312.

Once the first 256 input likelihood scores for each pattern have been loaded into the respective memory 312 (corresponding in the illustrated embodiment to 256 read-outs of the contents of memory 302), memories 312 are operated in the forward recirculating mode whereby the last entry in the shift register (the likelihood score corresponding to the 256th frame), is read from the memory and is passed through now enabled gates 321 and 333 to become the input over lines 315 at the other end of the same shift register memory. Thus, as the memory 312 is repeatedly "shifted", the likelihood scores for each target pattern for each of the last 256 frames are read out, in reverse chronological order, and are reinserted into the shift register, in the same sequence. Thus, after 256 "counts" over forward shift line 318, the shift register will return to its original data state. Now, however, the next likelihood score is entered into the registers, in sequence, from memory 302, memory 302 having been loaded during the time duration when registers 312 were being shifted. The new likelihood score is loaded through gates 338 in response to a backward load pulse over lines 319. The oldest likelihood score in memory 312 is then lost.

Shift registers 312 then contain the second through 257th likelihood scores for each target pattern. These scores are shifted in the same manner as described herein above; and the process of shifting and loading is continued at each new frame time so that the likelihood scores are read out, at the appropriate time, for processing as described hereinafter.

Figure 10:
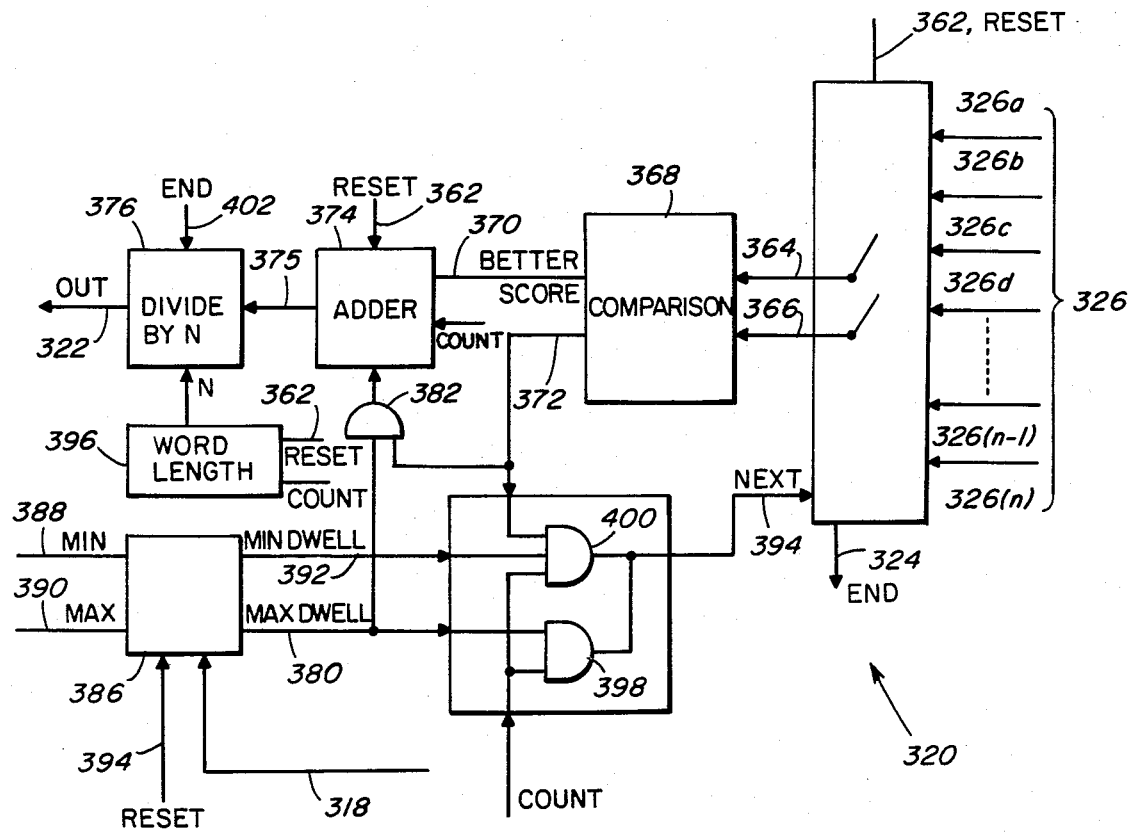
FIG. 10 is an electrical circuit diagram of a particular hardware embodiment for implementing the duration and comparison control process of the invention.

Referring to FIG. 10, the output of each group of registers 312 representing a keyword is made available over lines 326 to a respective controlled two-pole multiplexer switch 360 whose operation proceeds as follows. At the beginning of each frame time, each multiplexer 360 is reset by a reset signal over a line 362. In response to the reset signal over line 362, output lines 364, 366 of multiplexer 360 are connected respectively to the first input lines, here lines 326(a) and 326(b). At the beginning of the frame time, the data on lines 326(a) represent the input likelihood score during the "present" frame time for the last target pattern of the keyword and lines 326(b), the score during the "present" frame target pattern for the next previous target pattern. The output of multiplexer 360 over lines 364 and 366 is connected to a numerical comparison element, for example, an arithmetic element 368, which provides the "better" input score over lines 370 and the identification of which of lines 364, 366, had the better input score over a line 372. The better score is added to the contents of an adder 374. (The contents of adder 374 is reset to zero at the beginning of each frame time by the reset signal over line 362.) The accumulated likelihood score is then "normalized" by dividing the contents of the adder 374, available over lines 375 and representing the total accumulated score, by the number of likelihood scores, N, which have been accumulated. The division is performed in a divider circuit 376. The output of the divider circuit 376, over lines 378, represents the average score per node and is employed in determining whether the respective keyword is a possible detected keyword candidate.

The output of the comparison circuit 368 over line 372 is employed, in conjunction with the minimum and maximum dwell times, to determine whether the multiplexer 360 should be incremented to the next two input likelihood scores, that is, the likelihood scores available over lines 326(b) and 326(c) (corresponding respectively to the next-to-last and second to last target patterns of the keyword). The signal level over lines 372 is also employed in connection with the maximum dwell time signal over a line 380 to determine whether a penalty should be added to the accumulated word score in adder 374. Thus, if, at a time when the maximum dwell time for the then present target pattern has been exceeded and it is the likelihood score over line 364 which is "better", then the gate 382 is actuated and a penalty count is added to the accumulated score in adder 374.

A preprogrammed dwell time monitoring element 386, substantially a counter, receives over lines 388 and 390 the minimum and the maximum dwell times for the various target patterns. When the minimum dwell time is exceeded by the count in counter 386, a signal level is placed on a minimum dwell time exceeded line 392. When the maximum dwell time for the present target pattern is exceeded, a corresponding signal level is placed on the line 380 as noted above. Counter 386 is reset each time multiplexer 360 is incremented to the next pair of lines by the signals over a line 394 (as discussed in detail below); and the counter is incremented each time the recirculating memories 312 are shifted by a count pulse on lines 318. A word length counter 396 provides the word length over lines 397 to divider circuit 376. Counter 396 is reset at the beginning of each frame time by the reset signal over line 362 (and corresponding to a shift backward signal over line 319) and is incremented each time the recirculating memory 312 is shifted by the pulses on line 318.

In accordance with the invention, the minimum and maximum dwell times control, in combination with the signal level on line 372, the incrementing of multiplexer 360. For example, if the present target pattern has a "better score", as indicated by the scores over lines 364 and 366, then a "next signal" is obtained only if the maximum dwell time has been exceeded. (This is effected by a pulse over line 318, passed through a gate 398, to line 394.) On the other hand, if only the minimum dwell time is exceeded but the "better" signal is over lines 366, that is, the next previous target pattern is "better", then a pulse over lines 318 will be passed through a gate 400 to effect a next signal over line 394, and the multiplexer will again be incremented to the next "pair" of target pattern likelihood score input lines. In all other circumstances, in the illustrated embodiment, the multiplexer is not incremented.

When a multiplexer 360 is at the last pair of input lines 326, lines 326(x—1) and 326(x) in the illustrated embodiment, the receipt of a "next" signal over line 394 causes an "end" signal over line 324 to be generated. The end signal has the effect of "freezing" the output of the divider circuit 376, and communicating that the score for the keyword has been attained.

As noted above, when "end" signals are achieved from all of the comparison circuits 320, the best scores are reviewed and a decision made in accordance with the criteria set forth above. The decision is made before the beginning of a next frame time, in real time preferably, and the entire procedure begins again.

In view of the foregoing, it may be seen that several objects of the present invention are achieved and other advantageous results have been obtained.

It will be appreciated that the keyword recognition method and apparatus described herein can include isolated speech recognition as a special application. Additions, subtractions, deletions, and other modifications of the described preferred embodiments, will be obvious to those skilled in the art, and are within the scope of the following claims.

What is claimed is:

1. In a speech analysis system for recognizing at least one predetermined keyword in an audio signal, each keyword being characterized by a template having at least one target pattern, and each target pattern representing at least one short-term power spectrum, and each target pattern having a minimum dwell time duration and a maximum dwell time duration, the method comprising the steps of:

forming at a repetitive frame rate, a sequence of frame patterns from and representing said audio signal, each frame pattern being associated with a frame time, said frame rate corresponding to a frame interval less than one-half the minimum dwell time duration, generating, for each frame pattern, a numerical measure of the similarity of said each frame pattern with ones of said target patterns, accumulating, for each frame time and each keyword, and using said numerical measures and said minimum and maximum dwell times, a numerical word score representing the likelihood that a said keyword ended at a said frame time, said accumulating step including the step of accumulating, for each keyword, the numerical measures for each of a continuous sequence of said repetitively formed frame patterns, starting with the numerical measure of the similarity of a present frame pattern and a last target pattern of said keyword, and generating at least a preliminary keyword recognition decision whenever the numerical word score for a keyword exceeds a predetermined recognition level.

2. The method of claim 1 wherein said accumulating step further comprises the steps of adding to the accumulated word score at each frame pattern of the sequence, wherein the dwell time for the then present target pattern is not greater than the minimum dwell time, a numerical quantity representing the better of the numerical measure representing the similarity of said frame pattern and the then present target pattern and the numerical measure representing the similarity of said frame pattern and a next previous target pattern, adding to the accumulated word score at each frame pattern occurring at a frame time which exceeds the minimum dwell time of the then present target pattern, the better of the numerical measure representing the similarity of said frame pattern and the then present target pattern and the numerical measure representing the similarity of said frame pattern and the next previous target pattern, updating the then present target pattern when both the minimum dwell time is exceeded and the numerical measure for the next previous target pattern is better than the numerical measure for the then present target pattern, by designating the next previous target pattern as the new then present target pattern, and designating the next previous target pattern as the new then present target pattern whenever said maximum dwell time for the then present target pattern is exceeded.

3. The method of claim 2 further comprising the steps of maintaining a frame count of the number of pattern frames employed in determining said numerical word score for a keyword and generating a normalized word score by dividing the accumulated numerical word score for a keyword by the number of pattern frames employed in generating said score.

4. The method of claim 3 wherein said second adding step further comprises the step of adding a penalty value to the accumulated score for a keyword whenever the maximum dwell time of a target pattern component of the keyword is exceeded.

5. In a speech analysis system for recognizing at least one predetermined keyword in an audio signal, each keyword being characterized by a template having at least one target pattern, and each target pattern representing at least one short-term power spectrum, and each target pattern having a minimum dwell time duration and a maximum dwell time duration, the improvement comprising means for forming at a repetitive frame rate, a sequence of frame patterns from and representing said audio signal, each frame pattern being associated with a frame time, said frame rate corresponding to a frame interval wherein each target pattern has associated therewith at least two frame patterns, means for generating, for each frame pattern, a numerical measure of the similarity of said each frame pattern with selected ones of said target patterns, means for accumulating, for each frame time and each keyword, and using said numerical measures, a numerical word score representing the likelihood that a said keyword ended at a said frame time, said accumulating means including means for accumulating, for each keyword, the numerical measure for each of a continuous sequence of said repetitively formed frame patterns, starting with the numerical measure of the similarity of a present frame pattern and a last target pattern of said keyword, and means for generating at least a preliminary keyword recognition decision when the numerical value for a keyword exceeds a predetermined recognition level.

6. The apparatus of claim 5 wherein said accumulating means further comprises first means for adding to the accumulated word score at each frame pattern of the sequence, wherein the minimum dwell time for the then present target pattern is not exceeded, a numerical quantity representing the better of the numerical measure representing the similarity of said frame pattern and the then present target pattern and the numerical measure representing the similarity of said frame pattern and a next previous target pattern, second means for adding to the accumulated word score at each frame pattern occurring at a frame time which exceeds the minimum dwell time of the then present target pattern, the better of the numerical measure representing the similarity of said frame pattern and the then present target pattern and the numerical measure representing the similarity of said frame pattern and the next previous target pattern, means for updating the then present target pattern when both the minimum dwell time is exceeded and the numerical measure for the next previous target pattern is better than the numerical measure for the then present target pattern, by designating the next previous target pattern as the new then present target pattern, and means for selecting the next previous target pattern as the new then present target pattern whenever said maximum dwell time for the then present target pattern is exceeded.

7. The apparatus of claim 6 further comprising counter means for maintaining a frame count of the number of pattern frames employed in determining said numerical word score for a keyword and means for generating a normalized word score by dividing the accumulated numerical word score for a keyword by the number of pattern frames employed in generating said score.

8. The apparatus of claim 7 wherein said second adding means further comprises means for adding a penalty value to the accumulated score for a keyword whenever the maximum dwell time of a target pattern component of the keyword is exceeded.

9. In a speech analysis apparatus for recognizing at least one keyword in an audio signal, each keyword being characterized by a template having at least one target pattern, each target pattern representing at least one short-term power spectrum, and each target pattern having associated therewith a plurality of sequential dwell time positions, including at least one required dwell time position and at least one optional dwell time position, the number of said required and optional dwell time positions being a measure of the minimum and maximum time duration of a target pattern, the recognition method comprising the steps of:

forming at a repetitive frame time, a sequence of frame patterns from and representing said audio signal, generating a numerical measure of the similarity of each said frame pattern with each of said target patterns, accumulating for any target pattern second and later required dwell time position, and for each target pattern optional dwell time position, the sum of the accumulated score for the previous target pattern dwell time position during the previous frame time and the numerical measure associated with the target pattern during the present frame time, accumulating, for each keyword first target pattern, first required dwell time position, the sum of the score of the first dwell time position during the previous frame time, and the present numerical measure associated with the keyword first target pattern, accumulating, for each other target pattern first required dwell time position, the sum of the best ending accumulated score for the previous target pattern of the same keyword and the present numerical measure associated with the target pattern, and generating a recognition decision, based upon accumulating values of the possible word endings of the last target pattern of each keyword.

10. The method of claim 9 further comprising the step of storing, in association with each dwell time position accumulated score, a word duration count corresponding to the time position length of the keyword associated with the accumulated score at the dwell time position.

11. The method of claim 10 further comprising the step of storing, in association with each dwell time position accumulated score, a target pattern duration count corresponding to the position sequence of the dwell time position in the target pattern.

12. An apparatus for recognizing at least one keyword in an audio speech signal, each keyword being characterized by a template having at least one target pattern, each pattern representing at least one short term power spectrum, and each target pattern having a plurality of sequential dwell time positions including at least one required dwell time position and at least one optional dwell time position, the number of said required and optional dwell time positions being a measure of the minimum and maximum time duration of a target pattern, the recognition apparatus comprising, means for forming, at a repetitive frame time rate, a sequence of frame patterns from, and representing, said audio signal, means for generating a numerical measure of the similarity of each said frame pattern with each of said target patterns, first means for accumulating for any target pattern second and later required dwell time position and each target pattern optional dwell time position, the sum of the accumulated score for the previous target pattern dwell time position during the previous frame time and the numerical measure associated with the target pattern during the present frame time, second means for accumulating, for each keyword first target pattern, first required dwell time position, the sum of the score of the first time position during the previous frame time and the numerical measure associated with the keyword first target pattern during the present frame time, third means for accumulating, for each other first target pattern, first required dwell time position, the sum of the best ending accumulated score for the previous target pattern of the same keyword and the numerical measure associated with the target pattern during the present frame time, means for generating a recognition decision, based upon the accumulated numerical values, when a predetermined sequence occurs in said audio signal.

13. The apparatus of claim 12 further comprising means for storing in association with each dwell time position accumulated score, a word duration count corresponding to the time position length of the keyword associated with the accumulated score at the dwell time position.

14. The apparatus of claim 13 further comprising second means for storing, in association with each dwell time position accumulated score, a target pattern duration count corresponding to the time of the dwell time position in the target pattern.

15. In a speech analysis apparatus for recognizing at least one keyword in an audio signal, each keyword being characterized by a template having at least one target pattern, each target pattern representing at least one short-term power spectrum, and each target pattern having associated therewith at least one required dwell time position and at least one optional dwell time position, the number of said required and optional dwell time positions being the measure of a minimum and maximum time duration of a target pattern, a method for forming reference patterns representing said keywords comprising the steps of:

dividing an incoming audio signal corresponding to a keyword into a plurality of subintervals, matching each subinterval to a unique reference pattern, making a second pass through said audio input signals representing said keyword for providing machine generated subintervals for said keywords, determining the interval durations for each subinterval, repeating said steps upon a plurality of audio input signals representing the same keyword, generating statistics describing the reference pattern durations associated with each subinterval, and determining the minimum and maximum dwell times for each reference pattern from said assembled statistics.

16. The method of claim 15 wherein said subintervals are initially spaced uniformly from the beginning to the end of an audio input keyword.

* * * * *